(12) United States Patent
Seto

(10) Patent No.: US 7,917,352 B2
(45) Date of Patent: Mar. 29, 2011

(54) LANGUAGE PROCESSING SYSTEM

(75) Inventor: Shigenobu Seto, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 918 days.

(21) Appl. No.: 11/508,841

(22) Filed: Aug. 24, 2006

(65) Prior Publication Data
US 2007/0055496 A1    Mar. 8, 2007

(30) Foreign Application Priority Data

Aug. 24, 2005 (JP) ................. 2005-242492

(51) Int. Cl.
*G06F 17/20* (2006.01)

(52) U.S. Cl. ........... 704/8; 704/9; 704/258; 704/260; 715/264

(58) Field of Classification Search .......... 704/9, 258, 704/260, 2–8; 715/264
See application file for complete search history.

(56) References Cited

U.S. PATENT DOCUMENTS

| | | | | |
|---|---|---|---|---|
| 4,829,423 A | * | 5/1989 | Tennant et al. ........... | 704/8 |
| 5,146,405 A | * | 9/1992 | Church .................... | 704/9 |
| 5,828,991 A | * | 10/1998 | Skiena et al. ............ | 704/9 |
| 5,960,385 A | * | 9/1999 | Skiena et al. ............ | 704/9 |
| 6,076,060 A | * | 6/2000 | Lin et al. ................. | 704/260 |
| 6,078,885 A | * | 6/2000 | Beutnagel ............... | 704/258 |
| 6,098,042 A | * | 8/2000 | Huynh ..................... | 704/260 |
| 6,182,028 B1 | * | 1/2001 | Karaali et al. ........... | 704/9 |
| 6,185,530 B1 | * | 2/2001 | Ittycheriah et al. ...... | 704/255 |
| 6,233,553 B1 | * | 5/2001 | Contolini et al. ......... | 704/220 |
| 6,233,718 B1 | * | 5/2001 | Vernon et al. ............ | 714/811 |
| 6,587,822 B2 | * | 7/2003 | Brown et al. ............. | 704/275 |
| 6,731,802 B1 | * | 5/2004 | Kacmarcik et al. ....... | 382/185 |
| 7,124,080 B2 | * | 10/2006 | Chen et al. ............... | 704/244 |
| 7,280,964 B2 | * | 10/2007 | Wilson et al. ............ | 704/251 |
| 7,437,290 B2 | * | 10/2008 | Danieli .................... | 704/251 |
| 7,440,889 B1 | * | 10/2008 | Skiena et al. ............ | 704/9 |
| 7,496,498 B2 | * | 2/2009 | Chu et al. ................. | 704/4 |
| 7,580,827 B1 | * | 8/2009 | Brants et al. ............. | 704/1 |
| 2002/0102025 A1 | * | 8/2002 | Wu et al. .................. | 382/229 |

FOREIGN PATENT DOCUMENTS

JP      5-165486        7/1993
JP      05165486 A  *   7/1993

OTHER PUBLICATIONS

Kamanaka, Text Voice Transforming Device, Jul. 2, 1993, Machine translation of JP 05165486A, pp. 1-10.*

* cited by examiner

*Primary Examiner* — David R Hudspeth
*Assistant Examiner* — Lamont M Spooner
(74) *Attorney, Agent, or Firm* — Oblon, Spivak, McClelland, Maier & Neustadt, L.L.P.

(57) ABSTRACT

A language processing system including: a forbidden word memory part that stores a forbidden word; a sequence candidate generator that generates a plurality of word sequence candidates where each words are described separately from plain text; and a word sequence estimator that reads the forbidden word from the forbidden word memory part, excludes the word sequence candidate containing the forbidden word from the plurality of word sequence candidates, and selects an estimated word sequence with the highest concatenation possibility of the words from among the plurality of word sequence candidates.

10 Claims, 26 Drawing Sheets

50 LATTICE STRUCTURE

| | WORD (HEADWORD) | PRONUNCIATION | |
|---|---|---|---|
| C28 | 主 | OMO | C11 |
| C29 | 上の空 | UWANOSORA | C13 |

FIG. 5

```
START
  ↓
INPUT TEXT                       — S100
  ↓
GENERATE LATTICE STRUCTURE       — S101
  ↓
DELETE FORBIDDEN WORDS           — S102
  ↓
SELECT ESTIMATED WORD SEQUENCE   — S103
  ↓
GENERATE SPEECH FILE             — S104
  ↓
END
```

FIG. 6

| WORD (HEADWORD) | PRONUNCIATION | WORD CLASS |
|---|---|---|
| 下 | SHITA | 接尾 |
| 下 | SHIMO | 接尾 |
| 露 | TSUYU | 名詞 |
| 仏 | HOTOKE | 名詞 |

51
LATTICE STRUCTURE

| WORD (HEADWORD) | PRONUNCIATION |
|---|---|
| 上の空 | UWANOSORA |
| 間 | KAN |

神戸(kanbe) — C1

神戸(kanbe) — C2

在阪神戸の — C3

神戸 — C4

在－阪神－戸の — C5

戸 — C6

主記憶上の空間が — C7

主(nushi)記憶(kioku)上の空(uwanosora)間(kan)が(ga) — C26

主(nushi)記憶(kioku)上(ue)の(no)空間(kuukan)が(ga) — C27

主(shu)記憶(kioku)上(jyou)の(no)空間(kuukan)が(ga) — C30

主(shu)記憶(kioku)上の空(uwanosora)間(kan)が(ga) — C31

上の空間 — C32

上の空 — C33

間 — C34

上の空(uwanosora)間(kan) — C35

空(sora)間(kan) — C36

着 — C110

着(zhe) 火车票(huo3che1piao4) — C111

着火(zhao2huo3) 车票(chie1pioa4) — C112

| WORD (HEAD WORD) | PRONUNCIATION |
|---|---|
| 看 | ka1 |
| 看火 | zhao2huo3 |

C113 — 看
C114 — 看火
C103 — ka1
C107 — zhao2huo3

FIG. 21

| WORD (HEAD WORD) | PRONUNCIATION |
| --- | --- |
| mate | [maːtei] |

FIG. 25

| WORD (HEAD WORD) | PRONUNCIATION | WORD CLASS |
|---|---|---|
| pencil | [pensl] | v |

LANGUAGE PROCESSING SYSTEM

RELATED APPLICATION(S)

The present disclosure relates to the subject matter contained in Japanese Patent Application No. 2005-242492 filed on Aug. 24, 2005, which is incorporated herein by reference in its entirety.

FIELD

The present invention relates to a morphological analysis technique and in particular to a language processing system.

BACKGROUND

In the following description, texts, phrases, or words in Japanese including Japanese characters will be explained with reference to FIG. 17. In FIG. 17, pronunciations of each of the texts, phrases, and words will be shown by Roman alphabets in parenthesis.

A system of synthesizing a voice from text adopts a function of assigning a higher priority to the user-registered words additionally registered by the system user than the system words previously registered in the system in the speech synthesis. For example, if the system user adds a user-registered word of C1 as shown in FIG. 17 to the system, while a system word of C2 is registered in the system, later the system will synthesize a voice with the pronunciation of C1 taking precedence over the pronunciation of C2.

In a language like Japanese in which written words are not described separately, however, if text contains a user-registered word added by the system user at the stage of solid writing, there is a possibility that a word sequence not containing the word corresponding to the user-registered word may be generated in the process of morphological analysis. For example, assume that the system user registers text of C3 as shown in FIG. 17 as user-registered words expecting that the part C4 in the text C3 will be output as reading of C1. However, if a written text that are described separately as C5 is generated in the process of morphological analysis, a space is placed between C4 and C6 and therefore reading of C1 is not output (instead, reading of C2 should be output). In contrast, if text contains an undesirable word for the system user such as a forbidden word in broadcast domain (a word which is not allowed to be used on a broadcast), a technique of detecting a word matching a forbidden word in broadcast domain contained in a list after the word sequence is determined according to morphological analysis and then skipping the word matching the forbidden word in broadcast domain or replacing the word with another word is proposed. (For example, refer to JP-A-5-165486.) However, a system of preventing generation of a word sequence containing an undesirable word for the system user before determining a written text that are described separately does not exist.

The same problem still exists in a language in which a space is left between words (the language in which written text are described separately). Although a word boundary is clear, if the strength of concatenation of the preceding and following words is evaluated in morphological analysis for determining a word sequence, even if a word is registered as the user-registered word, the word sequence containing the word corresponding to the user-registered word is not necessarily generated.

SUMMARY

One of objects of the present invention is to provide a language processing system of preventing generation of a word sequence containing an undesirable word for the system user.

According to a first aspect of the invention, there is provided language processing system including: a forbidden word memory part that stores a forbidden word; a sequence candidate generator that generates a plurality of word sequence candidates each with a space left between words from plain text; and a word sequence estimator that reads the forbidden word from the forbidden word memory part, excludes the word sequence candidate containing the forbidden word from the plurality of word sequence candidates, and selects an estimated word sequence with the highest concatenation possibility of the words from among the plurality of word sequence candidates.

According to a second aspect of the invention, there is provided a language processing system including: a forbidden word memory part that stores a forbidden word; a sequence candidate generator that reads the forbidden word stored in the forbidden word memory part, prohibits use of the forbidden word, and generates a plurality of word sequence candidates each with a space left between words from plain text; and a word sequence estimator that selects an estimated word sequence with the highest concatenation possibility of the words from among the plurality of word sequence candidates.

BRIEF DESCRIPTION OF THE DRAWINGS

In the accompanying drawings:

FIG. 5 is a flowchart to show a language processing system according to the first embodiment;

FIG. 6 is a second table to show forbidden words stored in the forbidden word memory part according to the first embodiment;

FIG. 17 is a figure to show example texts and phrases including Japanese and Chinese characters;

FIG. 20 is a table to show forbidden words stored in the forbidden word memory part for Chinese language;

FIG. 21 is a table to show forbidden words stored in the forbidden word memory part for English language;

FIG. 25 is a table to show forbidden words stored in the forbidden word memory part for English language;

DETAILED DESCRIPTION OF THE EMBODIMENT(S)

Figure 1:
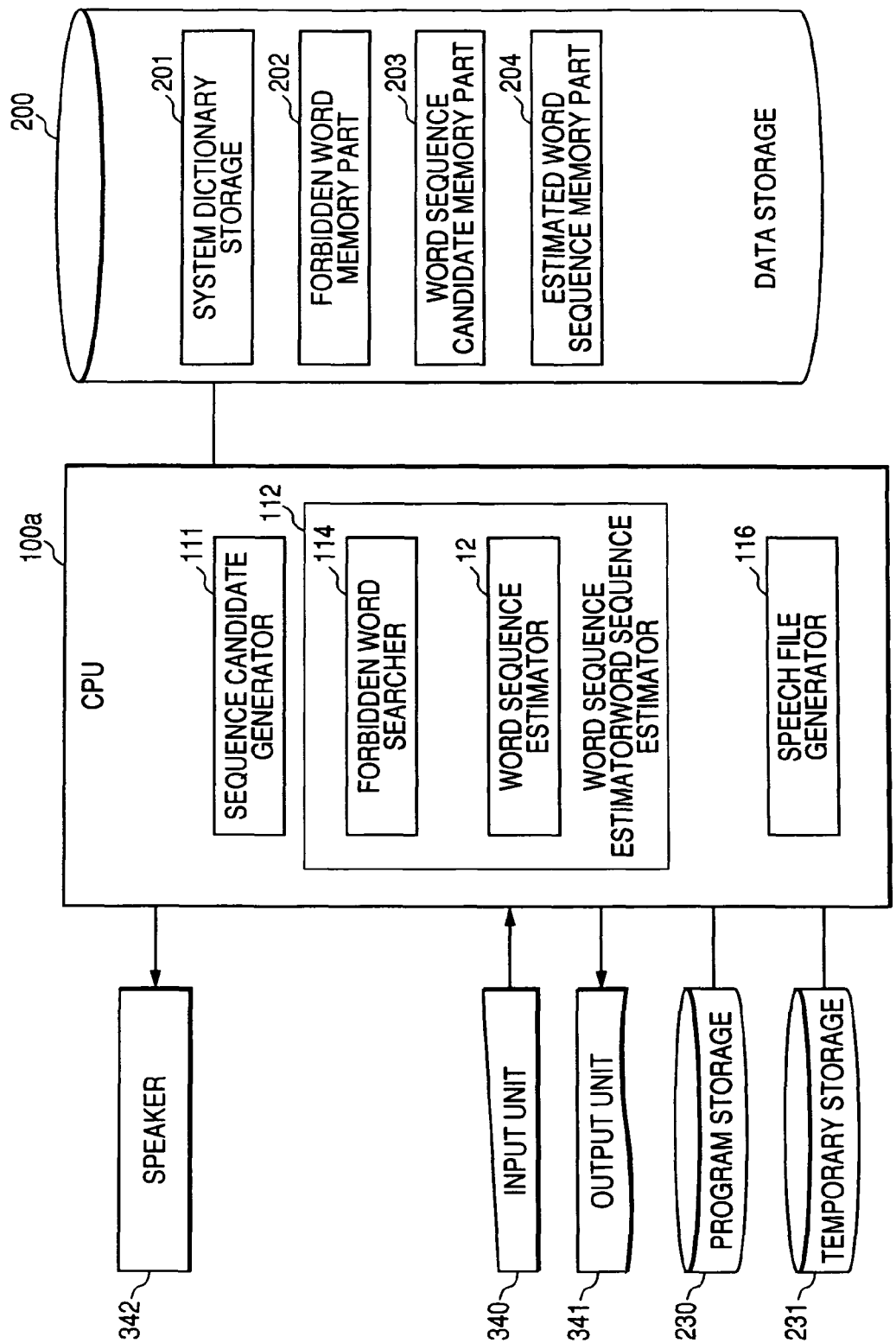
FIG. 1 is a block diagram to show a language processing system according to a first embodiment.

Referring now to the accompanying drawings, there are shown preferred embodiments of the invention. The identical parts or similar parts described below with reference to the accompanying drawings are denoted by the same or similar reference numerals. The following embodiments illustrate apparatus and methods for embodying the technical idea of the invention and the technical idea of the invention does not limit the placement, etc., of components to those described below. Various changes can be added to the technical idea of the invention in the claims.

First Embodiment

A language processing system according to a first embodiment includes a central processing unit (CPU) 100a and data storage 200 connected to the CPU 100a as shown in FIG. 1. The data storage 200 includes a forbidden word memory part 202 and a system dictionary storage 201. The forbidden word memory part 202 stores forbidden words read in prohibited reading. The system dictionary storage 201 stores a system dictionary recording readings and parts of speech of words. The CPU 100a includes a sequence candidate generator 111 and a word sequence estimator 112. The sequence candidate generator 111 generates a plurality of word sequence candidates each with a space left between words as words from plain text. The word sequence estimator 112 reads a forbidden word from the forbidden word memory part 202, excludes each word sequence candidate containing the banded word from the word sequence candidates, and selects the optimum word candidate with the highest concatenation possibility of words from among the word sequence candidates.

Figures 2, 3:
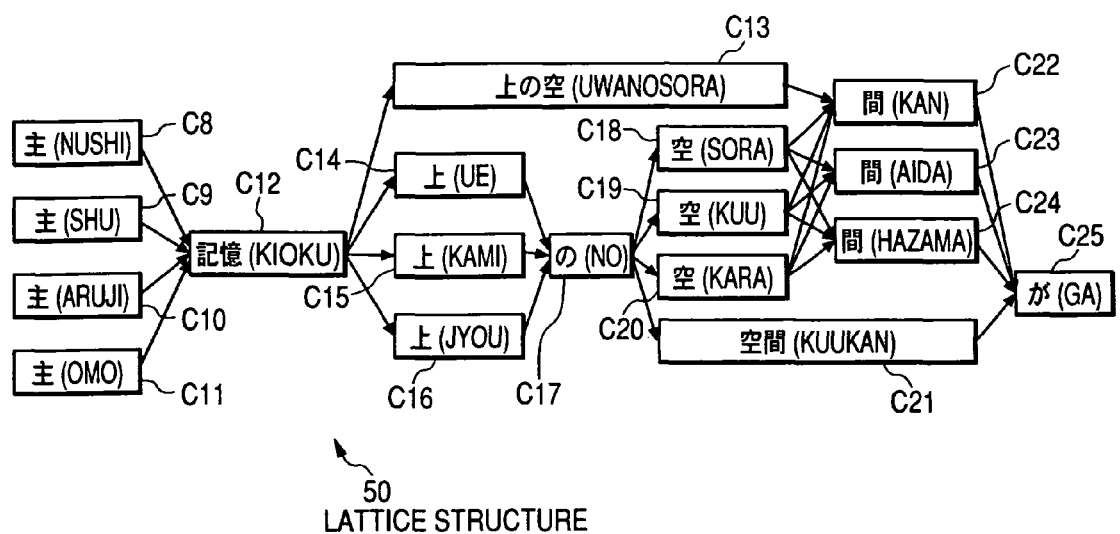
FIG. 2 is a first schematic drawing of a lattice structure generated by the language processing system according to the first embodiment.
FIG. 3 is a first table to show forbidden words stored in a forbidden word memory part according to the first embodiment.

Specifically, the sequence candidate generator 111 decomposes text input in solid writing into words by referencing the system dictionary and further generates a lattice structure with the words placed at lattice points. For example, if text of C7 as shown in FIG. 17 is input and words with readings of C8-C25 as shown in FIG. 2 are registered in the system dictionary, the sequence candidate generator 111 generates a lattice structure 50 shown in FIG. 2, combinations of the words registered in the system dictionary. The lattice structure 50 contains a plurality of word sequence candidates. For example, starting at C8, a word sequence candidates of C26 or C27 as shown in FIG. 17 can be generated.

Figure 18:
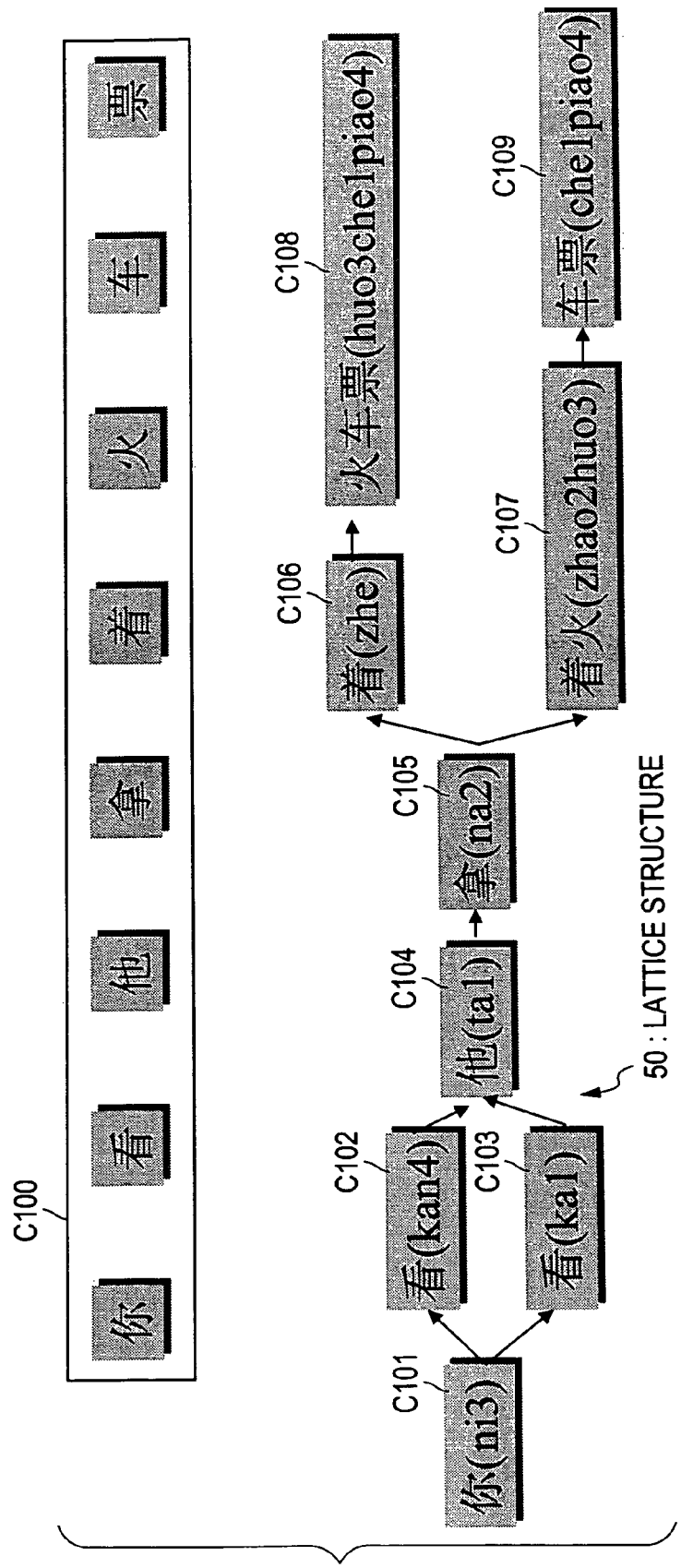
FIG. 18 is a schematic drawing of a lattice structure for Chinese language.

Likewise, for example in Chinese, if Chinese text of C100 as shown in FIG. 18 is input and words with readings of C101-C109 are registered in the system dictionary, the sequence candidate generator 111 generates a lattice structure 50 shown in FIG. 18, combinations of the words registered in the system dictionary. The lattice structure 50 contains a plurality of word sequence candidates. For example, starting at C110, a word sequence candidates of C111 or C112 can be generated.

Figure 19:
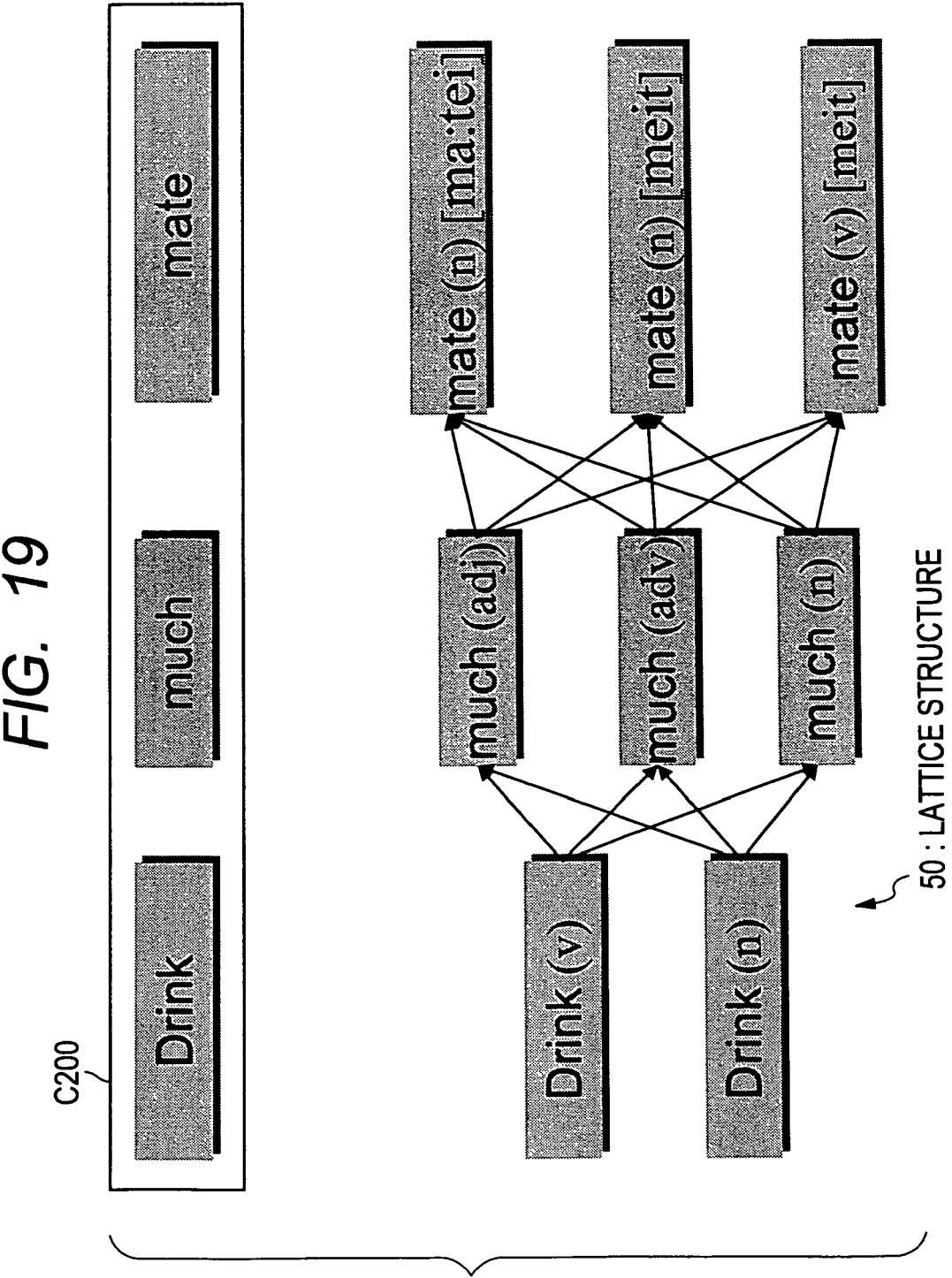
FIG. 19 is a schematic drawing of a lattice structure for English language.

For example in English, if English text of C200 as shown in FIG. 19 is input and words with readings of "drink", "much", and "mate" are registered in the system dictionary, the sequence candidate generator 111 generates a lattice structure 50 shown in FIG. 19, combinations of the words registered in the system dictionary. The lattice structure 50 contains a plurality of word sequence candidates. For example, starting at "much", a word sequence candidates of "much mate [meit]" or "much mate [ma:tei]" can be generated.

The forbidden word memory part 202 shown in FIG. 1 stores forbidden words read in "reading" to be prohibited from being output for the system user. For example, as shown in FIG. 3, the forbidden word memory part 202 stores a forbidden word C11 with reading of "omo" of reading to be prohibited from being output for the system user for the character C28, a forbidden word C13 with reading of "uwanosora" of reading to be prohibited from being output for the system user for the character string C29.

Likewise, for example, as shown in FIG. 20, the forbidden word memory part 202 stores a forbidden word C103 with reading of "ka1" of reading to be prohibited from being output for the system user for the character C113, a forbidden word C107 with reading of "zhao2huo3" of reading to be prohibited from being output for the system user for the character string C114.

For example, as shown in FIG. 21, the forbidden word memory part 202 stores a forbidden word "mate [ma:tei]" with reading of "[ma:tei]" of reading to be prohibited from being output for the system user for the character string "mate".

The word sequence estimator 112 shown in FIG. 1 includes a forbidden word searcher 114 and a word sequence estimator 12. The forbidden word searcher 114 searches the forbidden word memory part 202 for those corresponding to the words contained in the lattice structure 50 shown in FIG. 2. Further, if the forbidden word is found in the lattice structure 50, the forbidden word searcher 114 deletes the forbidden word from the lattice structure 50. For example, if the forbidden words C11 and C13 are stored in the forbidden word memory part 202 as shown in FIG. 3, the forbidden word searcher 114 deletes the forbidden words C11 and C13 from the lattice structure 50 as shown in FIG. 4.

Figure 22:
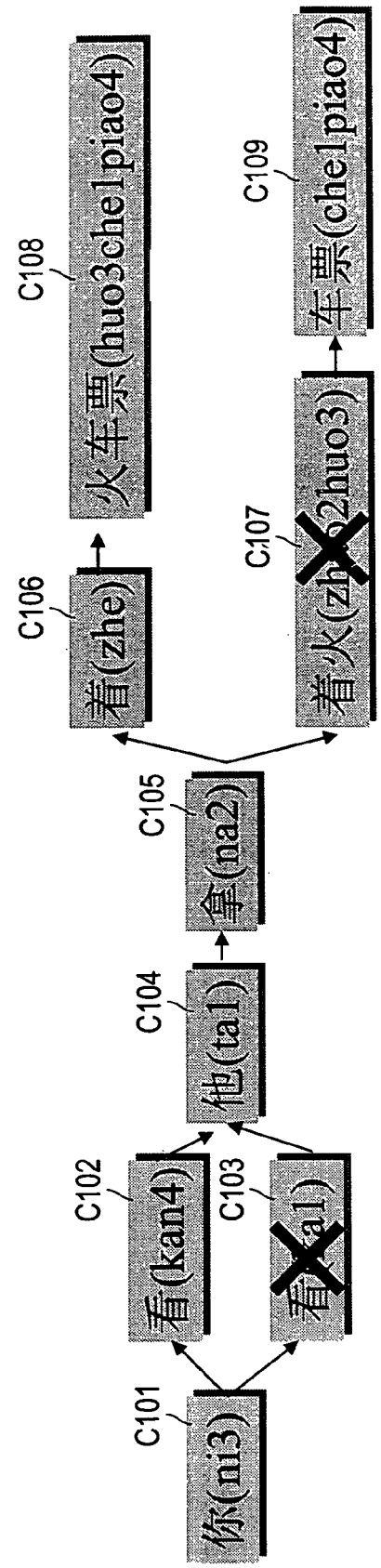
FIG. 22 is a schematic drawing of a lattice structure for Chinese language.

Likewise, the forbidden words C103 and C107 are deleted from the lattice structure 50 as shown in FIG. 22.

Figure 23:
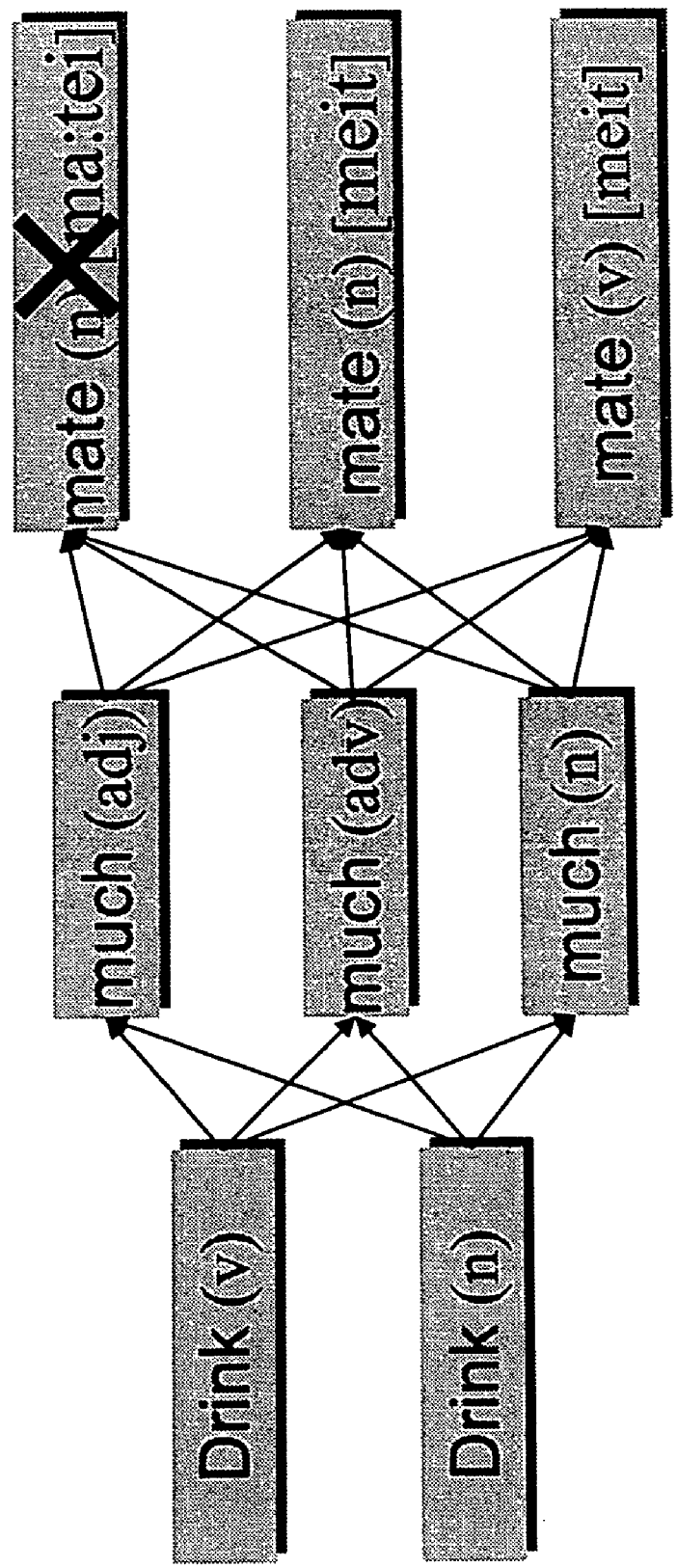
FIG. 23 is a schematic drawing of a lattice structure for English language.

Also likewise, the forbidden word "mate [ma:tei]" is deleted from the lattice structure 50 as shown in FIG. 23.

Figure 4:
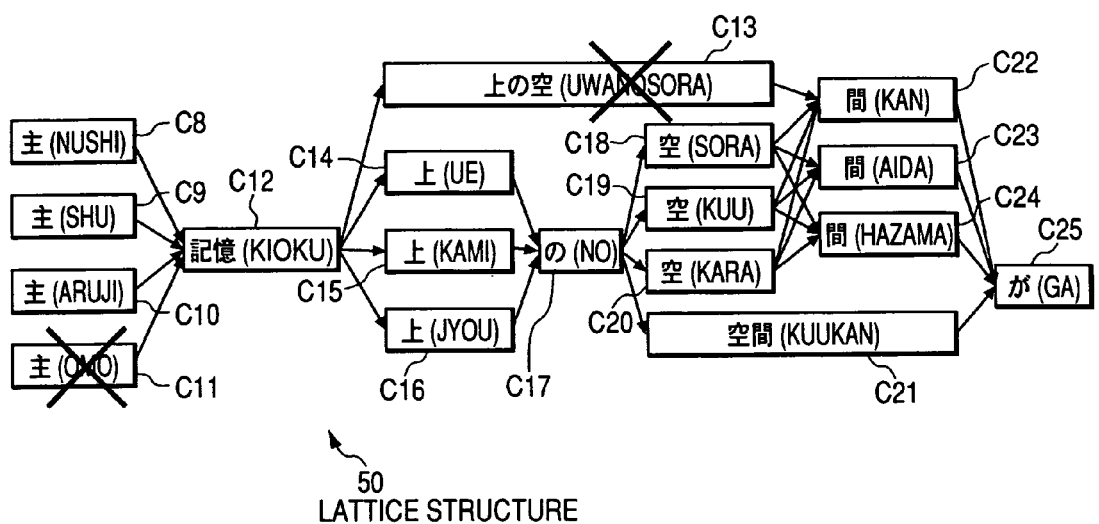
FIG. 4 is a second schematic drawing of a lattice structure generated by the language processing system according to the first embodiment.

The word sequence estimator 12 shown in FIG. 1 selects the estimated word sequence determined having the highest concatenation possibility of words and most plausible in reading using a search algorithm such as depth-first search or breadth-first search out of the lattice structure 50 shown in FIG. 4 from which the forbidden words are deleted. In the selection, heuristics search of longest match method, least number-of-clauses method (which is applicable for a language having a written text where each words are described separately, such as in Japanese language), minimum cost method, etc., is also used together. Here, the word sequence estimator 12 shown in FIG. 1 selects C30 shown in FIG. 17, the word sequence having the highest concatenation possibility of words as the estimated word sequence out of the lattice structure 50. A speech file generator 116 generates a speech file for outputting reading of the estimated word sequence.

The data storage 200 further includes a word sequence candidate memory part 203 and an estimated word sequence memory part 204. The word sequence candidate memory part 203 stores the lattice structure 50 generated by the sequence candidate generator 111. The estimated word sequence memory part 204 stores the estimated word sequence selected by the word sequence estimator 112. A speaker 342, an input unit 340, an output unit 341, program storage 230, and temporary storage 231 are further connected to the CPU 100a. The speaker 342 outputs reading of the estimated word sequence contained in a speech file by voice. As the input unit 340, a keyboard, a pointing device such as a mouse, and the like can be used, for example. An image display such as a liquid crystal display or a monitor, a printer, etc., can be used for the output unit 341. The program storage 230 stores the operating system for controlling the CPU 100a and the like. The temporary storage 231 stores the computation result of the CPU 100a sequentially. For example, record media for recording programs, such as semiconductor memory, a magnetic disk, an optical disk, a magneto-optical disk, and magnetic tape can be used as the program storage 230 and the temporary storage 231.

Next, a language processing method according to the first embodiment will be discussed with reference to a flowchart shown in FIG. 5.

At step S100, plain text containing Kanji characters is input to the sequence candidate generator 111 of the CPU 100a from the input unit 340 shown in FIG. 1. Here, by way of example, it is assumed that text of C7 shown in FIG. 17 is input. Next, at step S101, the sequence candidate generator 111 decomposes the input text C7 into words by referencing the system dictionary stored in the system dictionary storage 201 and further generates the lattice structure 50 shown in FIG. 2 made up of the words. The sequence candidate generator 111 stores the generated lattice structure 50 in the word sequence candidate memory part 203.

At step S102, the forbidden word searcher 114 shown in FIG. 1 reads the lattice structure 50 shown in FIG. 2 from the word sequence candidate memory part 203. Next, the forbidden word searcher 114 shown in FIG. 1 searches the forbidden word memory part 202 for those corresponding to the words contained in the lattice structure 50 shown in FIG. 2. Here, if the forbidden words C11 and C13 are stored in the forbidden word memory part 202 as shown in FIG. 3, the forbidden word searcher 114 deletes the forbidden words C11 and C13 from the lattice structure 50 shown in FIG. 4. Then, the forbidden word searcher 114 shown in FIG. 1 writes the lattice structure 50 from which the forbidden words are deleted into the word sequence candidate memory part 203 for storage.

At step S103, the word sequence estimator 12 reads the lattice structure 50 from which the forbidden words are deleted from the word sequence candidate memory part 203. Next, the word sequence estimator 12 selects the estimated word sequence determined most plausible in reading using a search algorithm and heuristics out of the lattice structure 50 shown in FIG. 4 from which the forbidden words are deleted. Here, the word sequence estimator 12 selects C30 shown in FIG. 17 as the estimated word sequence. Then, the word sequence estimator 112 stores the selected estimated word sequence in the estimated word sequence memory part 204.

At step S104, the speech file generator 116 reads C30 of the estimated word sequence from the estimated word sequence memory part 204. Next, the speech file generator 116 converts reading of the estimated word sequence C30 into a speech file. Then, the speech file generator 116 outputs the reading of the estimated word sequence contained in the speech file from the speaker 342 and terminates the language processing method according to the first embodiment.

As described above, according to the language processing system and the language processing method according to the first embodiment shown in FIGS. 1 and 5, if the system dictionary stores a word read with reading to be prohibited from being output for the system user, it is made possible to prevent undesirable reading from being added to the input text by storing the banded words in the forbidden word memory part 202. Thus, it is made possible to add user-desired reading to text at a higher probability. In the example shown in FIG. 3, each combination of a headword and pronunciation is stored in the forbidden word memory part 202. In contrast, each combination of a headword, pronunciation, and a word class may be stored in the forbidden word memory part 202 as shown in FIG. 6.

Figure 24:
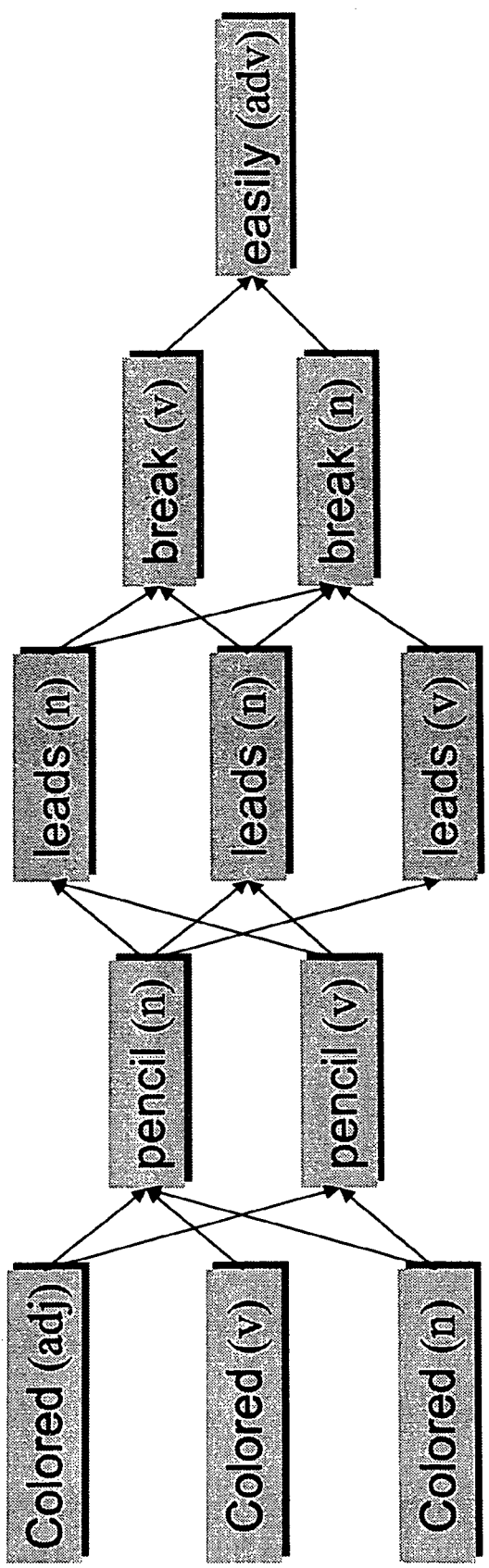
FIG. 24 is a schematic drawing of a lattice structure for English language.

For example, if English text of "Colored pencil leads break easily" is input and words with readings of "colored", "pencil", "leads", "break", and "easily" are registered in the system dictionary, the sequence candidate generator 111 generates a lattice structure 50 shown in FIG. 24, which indicates combinations of the words registered in the system dictionary.

For example, forbidden word "pencil (v) [pensl]", which is a verb having pronunciation "pensl" to be prohibited from being output for the system user for the character string "pencil", is stored in the forbidden word memory part 202 as shown in FIG. 25.

Figure 26:
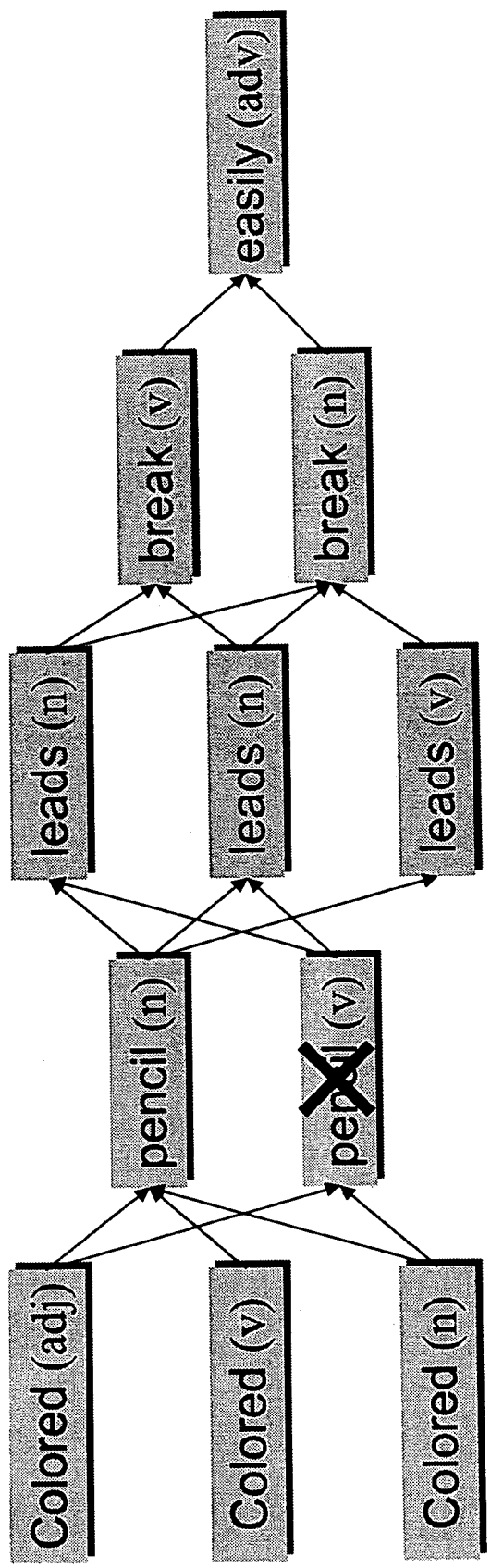
FIG. 26 is a schematic drawing of a lattice structure for English language.

Accordingly, the forbidden word searcher 114 deletes the forbidden word "pencil (v) [pensl]" from the lattice structure 50 as shown in FIG. 26.

As a result, it is made possible to precisely handle the sentence structure as well as the phonetic symbol of a word, and naturalness of intonation, etc., in reading improves.

Second Embodiment

Figure 7:
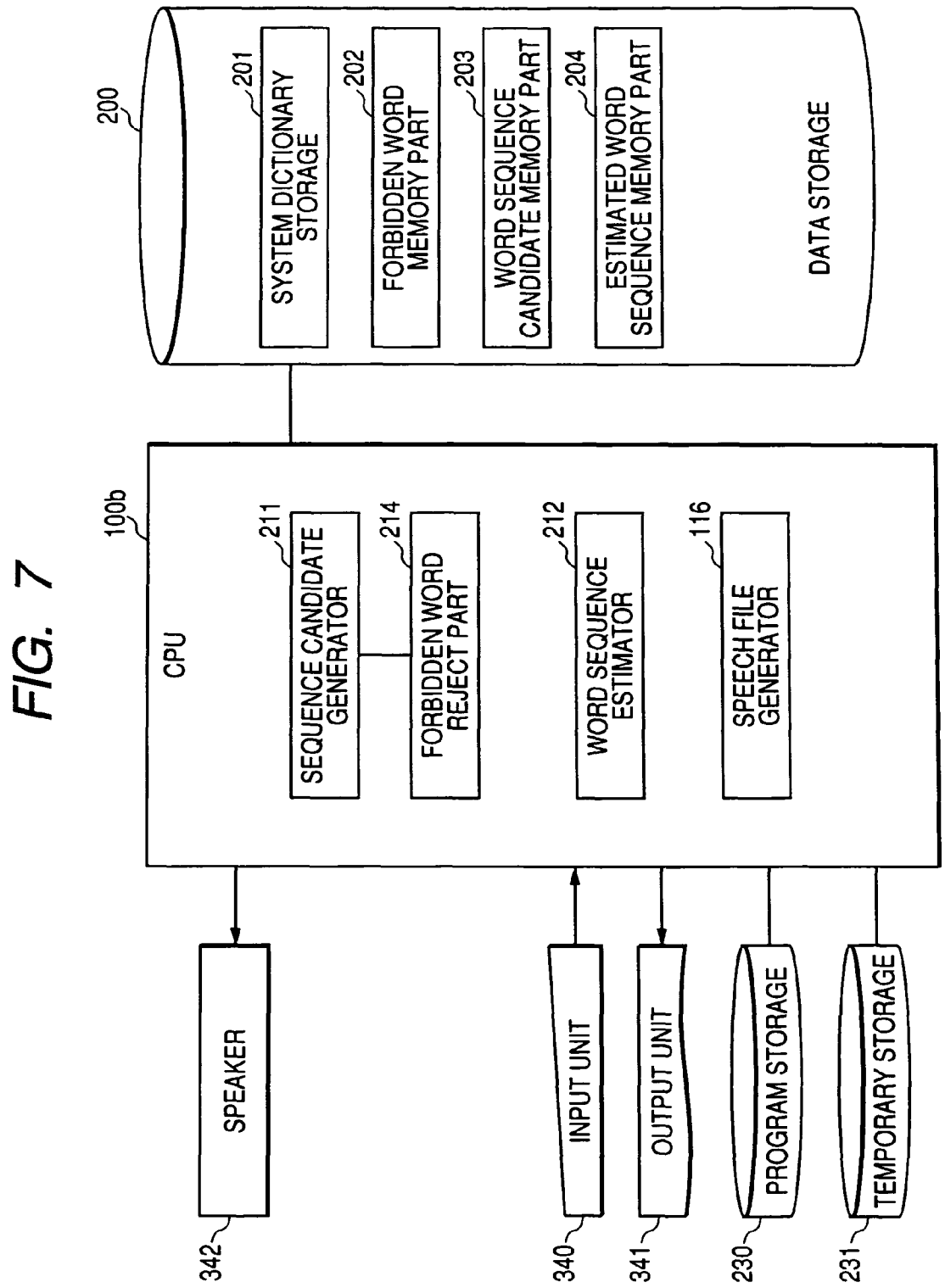
FIG. 7 is a block diagram to show a language processing system according to a second embodiment.
Figure 8:
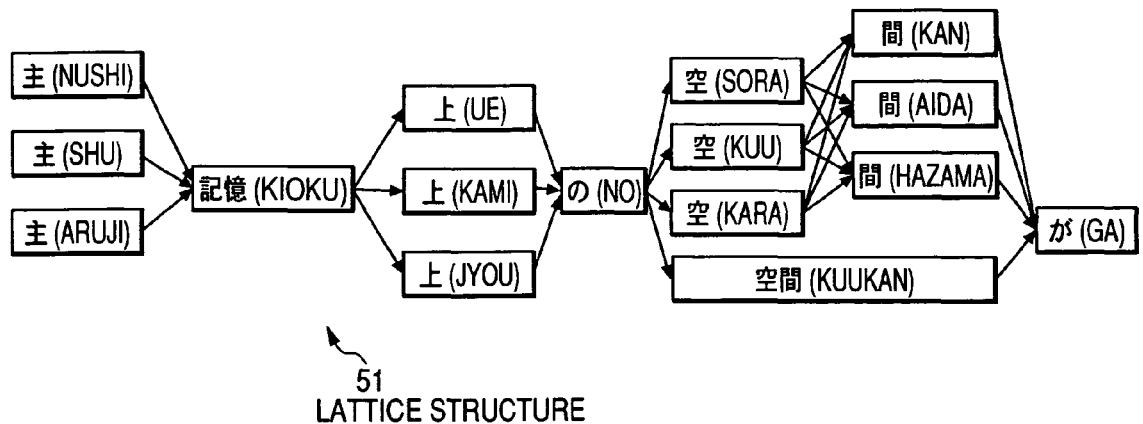
FIG. 8 is a schematic drawing of a lattice structure generated by the language processing system according to the second embodiment.

A language processing system according to a second embodiment differs from the language processing system shown in FIG. 1 in that a forbidden word reject part 214 is connected to a sequence candidate generator 211 as shown in FIG. 7. If a word matching any forbidden word stored in a forbidden word memory part 202 is stored in a system dictionary storage 201, the forbidden word reject part 214 prohibits the sequence candidate generator 211 from referencing the word matching the forbidden word registered in the system dictionary. Therefore, for example, if text of C7 is input to the sequence candidate generator 211, the sequence candidate generator 211 does not reference words C11 and C13 matching the forbidden words contained in the system dictionary and generates a lattice structure 51 containing no forbidden words as shown in FIG. 8. Other components of the language processing system shown in FIG. 7 are similar to those previously described with reference to FIG. 1 and therefore will not be discussed again.

Likewise, in a case where the subject language is Chinese, when a Chinese text C100 shown in FIG. 18 is input into the sequence candidate generator 211, the sequence candidate generator 211 does not reference the words C103 and C107 matching the forbidden words that are included in the system dictionary, and generates a lattice structure 51 containing no forbidden words, as shown in FIG. 22.

Also likewise, in a case where the subject language is English, when an English text "Drink much mate" C200 is input into the sequence candidate generator 211, the sequence candidate generator 211 does not reference the word "mate (n) [ma:tei]" matching the forbidden word that is included in the system dictionary, as shown in FIG. 19, and generates a lattice structure 51 containing no forbidden words, as shown in FIG. 23.

As another example, when an English text "Colored pencil leads break easily" is input into the sequence candidate generator 211, the sequence candidate generator 211 does not reference the word "pencil (v) [pensl]" matching the forbidden word that is included in the system dictionary, and generates a lattice structure 51 containing no forbidden words, as shown in FIG. 26.

Next, a language processing method according to the second embodiment will be discussed with reference to a flowchart shown in FIG. 9.

At step S200, plain text C7 shown in FIG. 17 containing Kanji characters is input to the sequence candidate generator 211 of a CPU 100b from an input unit 340 shown in FIG. 7. At step S201, if a word matching any forbidden word stored in the forbidden word memory part 202 is stored in the system dictionary storage 201, the forbidden word reject part 214 prohibits the sequence candidate generator 211 from referencing the word matching the forbidden word registered in the system dictionary.

At step S202, the sequence candidate generator 211 decomposes the input text C7 into words by referencing the system dictionary stored in the system dictionary storage 201 and further generates the lattice structure 51 shown in FIG. 8 made up of the words. At this time, the sequence candidate generator 211 is prohibited from referencing the word matching the forbidden word registered in the system dictionary at step S101 and therefore the generated lattice structure 51 does not contain any forbidden words. The sequence candidate generator 211 stores the generated lattice structure 51 containing no forbidden words in a word sequence candidate memory part 203.

At step S203, a word sequence estimator 212 reads the lattice structure 51 containing no forbidden words from the word sequence candidate memory part 203. Next, the word sequence estimator 212 selects the estimated word sequence determined most plausible in reading using a search algorithm and heuristics out of the lattice structure 51. Then, step S204 is executed like step S104, and the language processing method according to the second embodiment is terminated.

Figure 9:
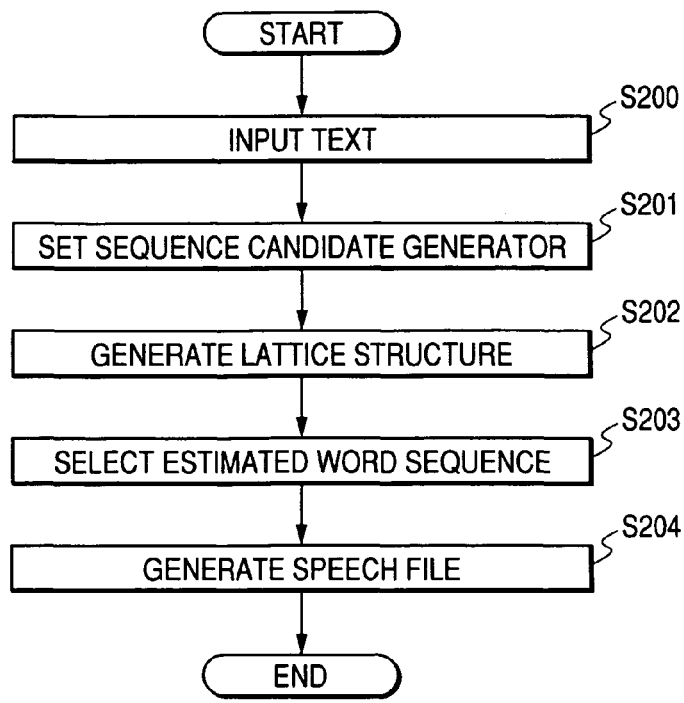
FIG. 9 is a flowchart to show a language processing system according to the second embodiment.

As described above, according to the language processing system and the language processing method according to the second embodiment shown in FIGS. 7 and 9, it is also made possible to prevent undesirable reading from being added to the input text.

Third Embodiment

Figure 10:
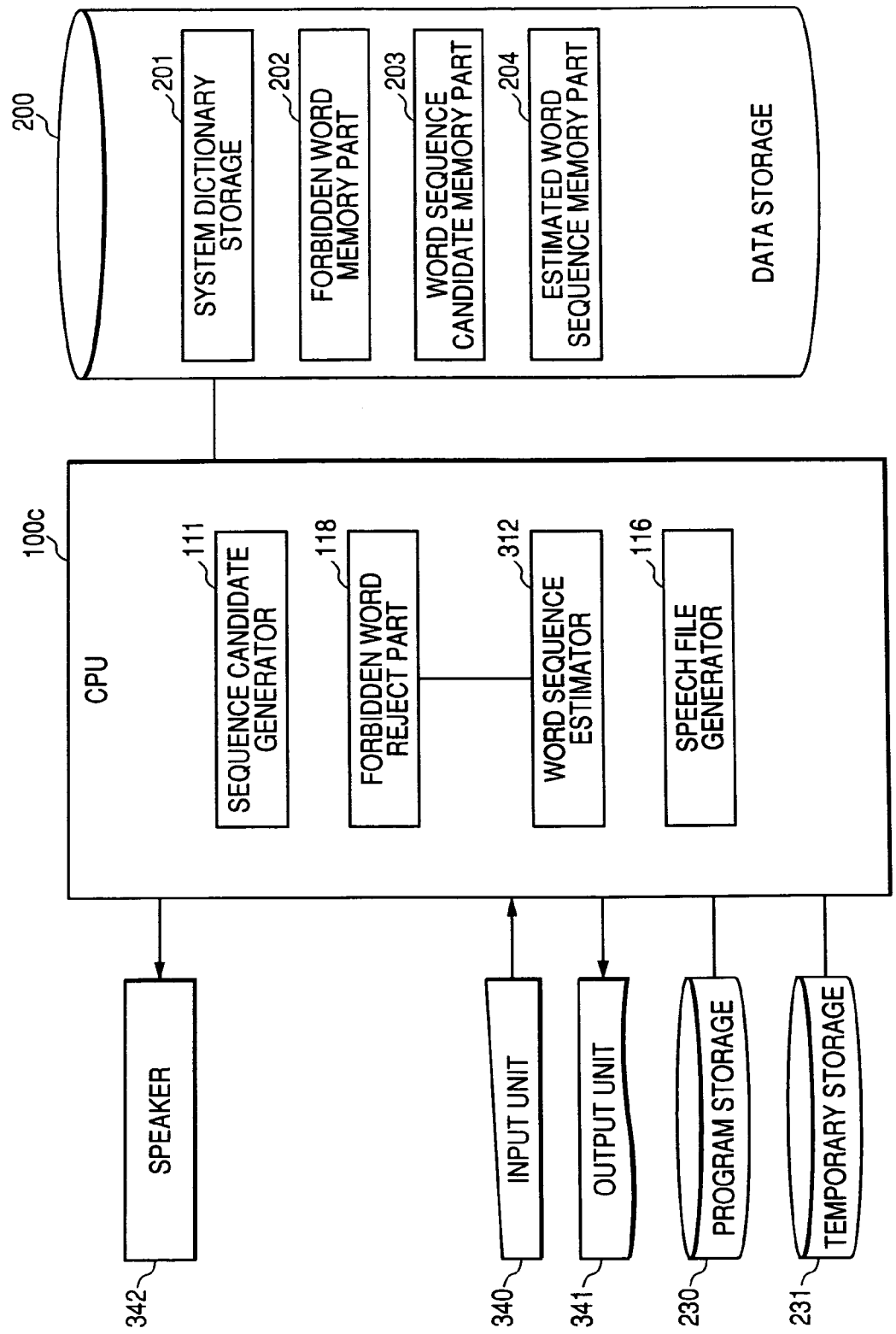
FIG. 10 is a block diagram to show a language processing system according to a third embodiment.

A language processing system according to a third embodiment differs from the language processing system shown in FIG. 1 in that a forbidden word reject part 314 is connected to a word sequence estimator 312 as shown in FIG. 10. If a word matching any forbidden word stored in a forbidden word memory part 202 is stored in a system dictionary storage 201, the forbidden word reject part 314 prohibits the word sequence estimator 312 from selecting a word sequence candidate containing the forbidden word as the estimated word sequence. Other components of the language processing system shown in FIG. 10 are similar to those previously described with reference to FIG. 1 and therefore will not be discussed again.

Next, a language processing method according to the third embodiment will be discussed using a flowchart of FIG. 11.

At step S300, plain text C7 containing Kanji characters is input to a sequence candidate generator 111 of a CPU 100c from an input unit 340 shown in FIG. 10. Next, at step S301, the sequence candidate generator 111 decomposes the input text C7 into words by referencing the system dictionary stored in the system dictionary storage 201 and further generates the lattice structure 50 shown in FIG. 2 made up of the words. The sequence candidate generator 111 stores the generated lattice structure 50 in a word sequence candidate memory part 203.

At step S302, if a word matching any forbidden word stored in the forbidden word memory part 202 is stored in the system dictionary storage 201, the forbidden word reject part 314 prohibits the word sequence estimator 312 from selecting a word sequence candidate containing the forbidden word as the estimated word sequence. At step S303, the word sequence estimator 312 reads the lattice structure 50 from the word sequence candidate memory part 203. Next, the word sequence estimator 312 selects the estimated word sequence determined most plausible in reading using a search algorithm and heuristics out of the lattice structure 50 while excluding the word sequence candidates containing any forbidden word. Then, step S304 is executed like step S104, and the language processing method according to the third embodiment is terminated.

Figure 11:
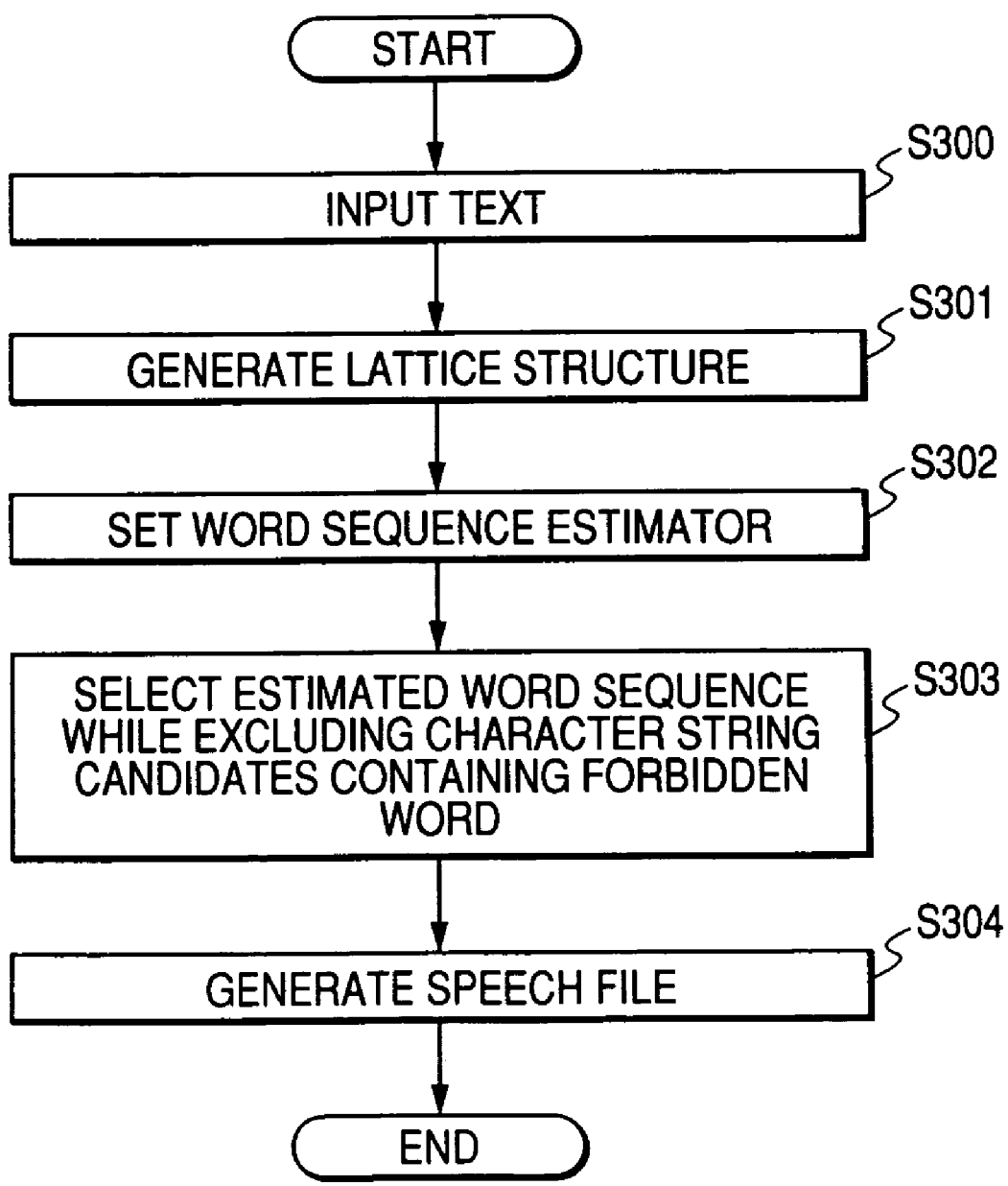
FIG. 11 is a flowchart to show a language processing system according to the third embodiment.

As described above, according to the language processing system and the language processing method according to the third embodiment shown in FIGS. 10 and 11, it is also made possible to prevent undesirable reading from being added to the input text.

Fourth Embodiment

Figure 12:
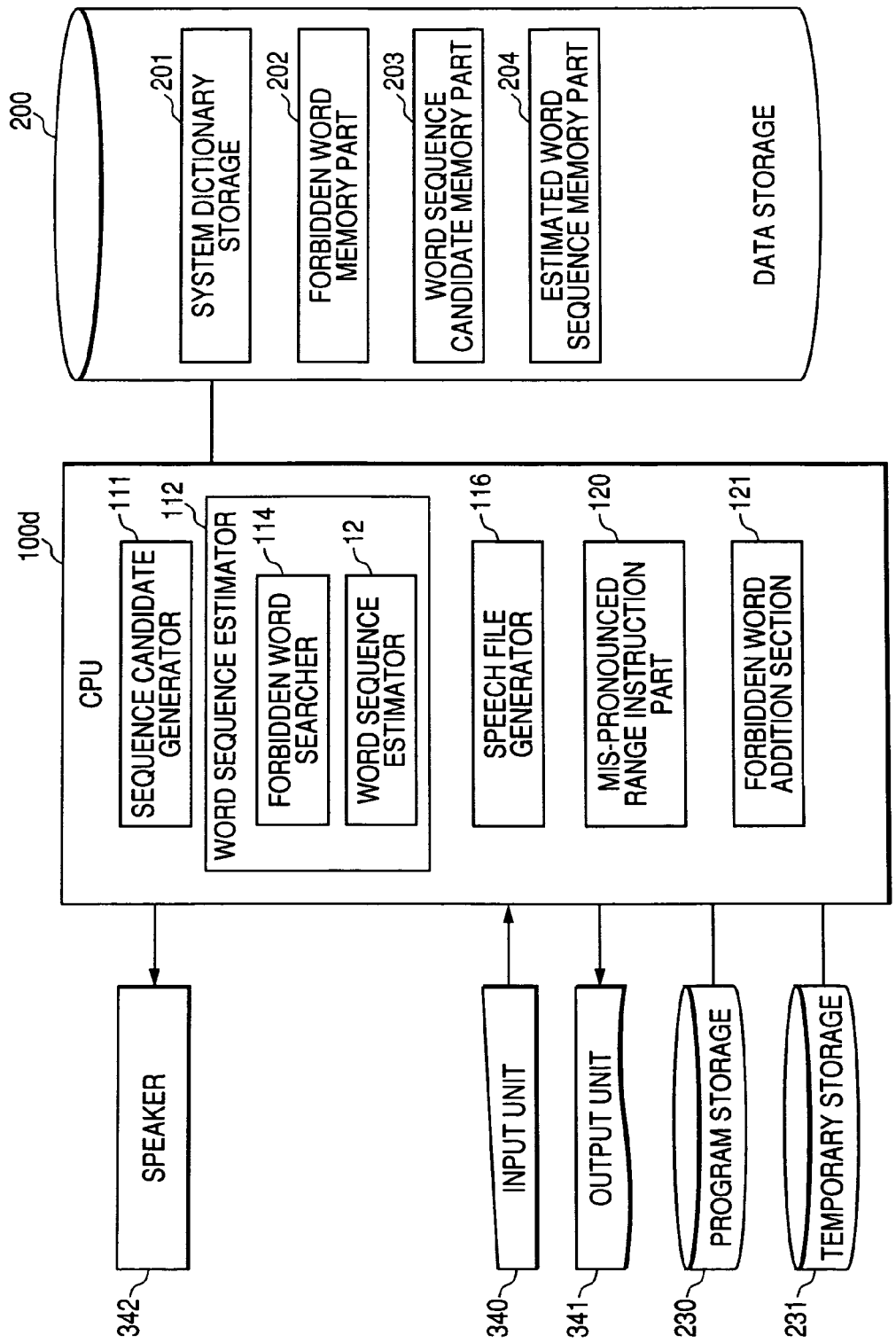
FIG. 12 is a block diagram to show a language processing system according to a fourth embodiment.
Figures 13, 14:
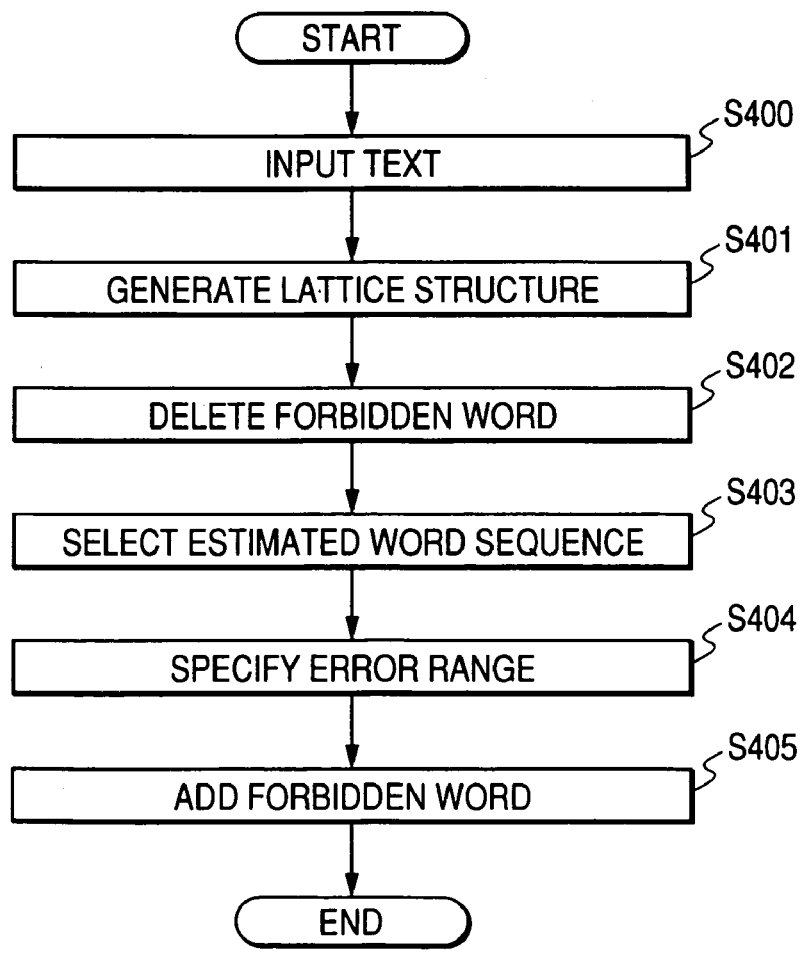
FIG. 13 is a table to show forbidden words stored in a forbidden word memory part according to the fourth embodiment.
FIG. 14 is a flowchart to show a language processing system according to the fourth embodiment.

A language processing system according to a fourth embodiment differs from the language processing system shown in FIG. 1 in that a CPU 10d further includes a mis-pronounced range instruction part 120 and a forbidden word addition section 121 as shown in FIG. 12. Here, for example, assume that a word sequence estimator 112 erroneously selects C31 shown in FIG. 17 as the estimated word sequence for input text C7. In this case, the mis-pronounced range instruction part 120 accepts instruction of mis-pronounced words with undesirable reading in the erroneously selected estimated word sequence from the system user. For example, if a character string of C32 is specified, the mis-pronounced range instruction part 120 divides the character string into words C13 and C22 shown in FIG. 17 by comparing the character string C32 with a lattice structure 50 and defines the words C13 and C22 as mis-pronounced words. The forbidden word addition section 121 adds the mis-pronounced words to a forbidden word memory part 202 as forbidden words for storage. FIG. 13 shows examples of forbidden words C13 and C22 added to and stored in the forbidden word memory part 202 at this time. Other components of the language processing system shown in FIG. 12 are similar to those previously described with reference to FIG. 1 and therefore will not be discussed again.

Figure 27:
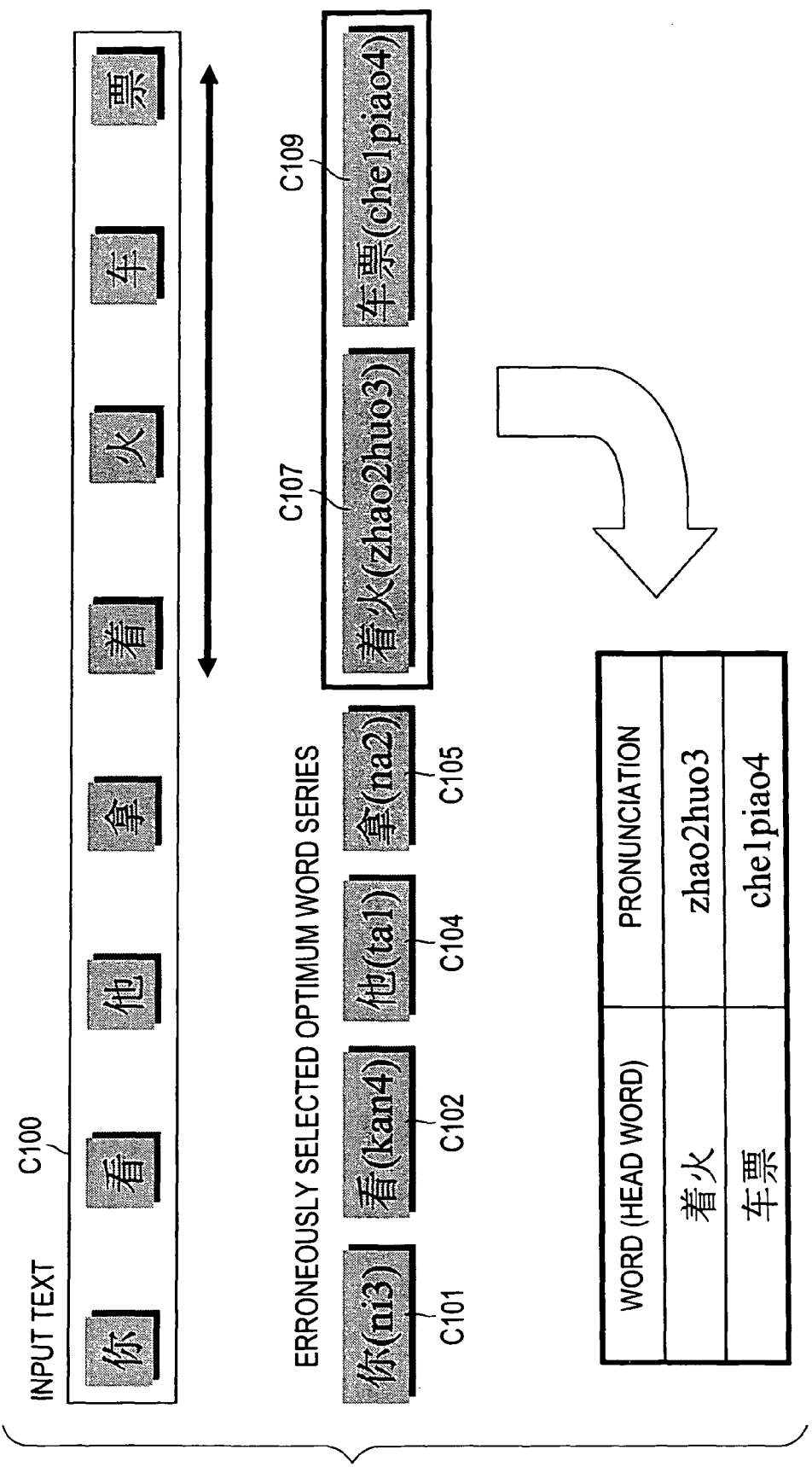
FIG. 27 is a schematic drawing for explaining an additional storing of a forbidden word for Chinese language.
Figure 28:
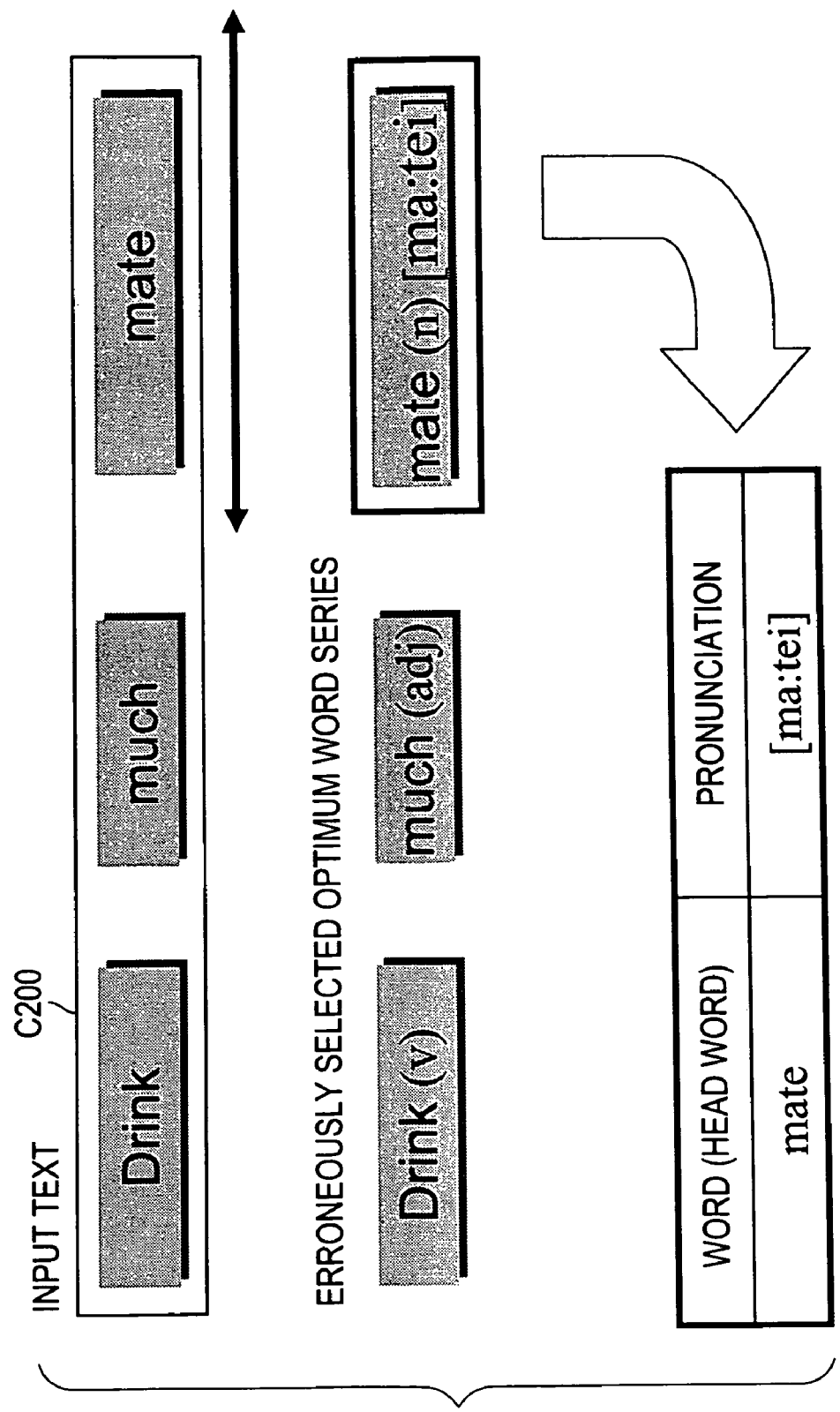
FIG. 28 is a schematic drawing for explaining an additional storing of a forbidden word for English language.

Likewise, for example, as shown in FIG. 27, assume that the word sequence estimator 112 erroneously selects C101, C102, C104, C105, C107, and C109 as the estimated word sequence for Chinese input text C100. The mis-pronounced range instruction part 120 accepts instruction of mis-pronounced words with undesirable reading in the erroneously selected estimated word sequence from the system user. For example, if a character string of C113 shown in FIG. 17 is specified, the mis-pronounced range instruction part 120 divides the character string into words C107 and C109 by comparing the character string C113 with a lattice structure 50 and defines the words as mis-pronounced words. The forbidden word addition section 121 adds the mis-pronounced words to the forbidden word memory part 202 as forbidden words for storage.

As for another example, as shown in FIG. 27, assume that the word sequence estimator 112 erroneously selects "drink (v)" "much (adv)" "mate (n) [ma:tei]" as the estimated word sequence for English input text "Drink much mate" C200. The mis-pronounced range instruction part 120 accepts instruction of mis-pronounced words with undesirable reading in the erroneously selected estimated word sequence from the system user. For example, if a character string of "mate" is specified, the mis-pronounced range instruction part 120 compares the character string "mate" with a lattice structure 50, identifies the character string as word "mate (n) [meit]", and defines the word as mis-pronounced word. The forbidden word addition section 121 adds the mis-pronounced word to the forbidden word memory part 202 as forbidden word for storage.

Next, a language processing method according to the fourth embodiment will be discussed with reference to a flowchart shown in FIG. 14.

Steps S400 and S401 shown in FIG. 14 are executed like steps S100 and S101 shown in FIG. 5. At step S402, a forbidden word searcher 114 shown in FIG. 12 reads a lattice structure from a word sequence candidate memory part 203. Next, the forbidden word searcher 114 deletes the word of the words contained in the lattice structure corresponding to the forbidden word stored in the forbidden word memory part 202. At this time, it is assumed that words C13 and C22 are not stored in the forbidden word memory part 202. Then, the forbidden word searcher 114 writes the lattice structure from which the forbidden word is deleted into the word sequence candidate memory part 203 for storage.

At step S403, a word sequence estimator 12 reads the lattice structure from which the forbidden word is deleted from the word sequence candidate memory part 203. Next, the word sequence estimator 12 selects the estimated word sequence determined most plausible in reading using a search algorithm and heuristics out of the lattice structure shown in FIG. 4 from which the forbidden word is deleted. Here, assume that the word sequence estimator 12 erroneously selects C31 shown in FIG. 17 as the estimated word sequence. Then, the word sequence estimator 112 stores the erroneously selected estimated word sequence in the estimated word sequence memory part 204, and an output unit 341 outputs the erroneously selected estimated word sequence.

At step S404, the mis-pronounced range instruction part 120 accepts entry of error range through an input unit 340 from the system user. If the system user enters the character string C32 contained in the erroneously selected estimated word sequence C31 as the error range, the mis-pronounced range instruction part 120 compares the character string C32 with the lattice structure, thereby dividing the character string into words C33 and C34, and defines the words C13 and C22 as mis-pronounced words. Then, the mis-pronounced range instruction part 120 transfers the mis-pronounced words to the forbidden word addition section 121.

Likewise, if the system user enters the character string C100 contained in the erroneously selected estimated word sequence C101, C102, C104, C105, C107, C109 for Chinese input text C100 as the error range, the mis-pronounced range instruction part 120 compares the character string C113 shown in FIG. 17 with the lattice structure, thereby dividing the character string into words C107 and C108, and defines the words C107 and C108 as mis-pronounced words. Then, the mis-pronounced range instruction part 120 transfers the mis-pronounced words to the forbidden word addition section 121.

Likewise, if the system user enters the character string "mate" contained in the erroneously selected estimated word sequence "drink (v)" "much (adv)" "mate (n) [ma:tei]" for English input text "Drink much mate" C200 as the error range, the mis-pronounced range instruction part 120 compares the character string "mate" with the lattice structure, thereby identifying the character string as word "mate (n) [meit]", and defines the word as mis-pronounced word. Then, the mis-pronounced range instruction part 120 transfers the mis-pronounced word to the forbidden word addition section 121.

At step S405, the forbidden word addition section 121 stores the mis-pronounced words C13 and C22 in the forbidden word memory part 202 as forbidden words and terminates the language processing method according to the fourth embodiment.

As described above, according to the language processing system and the language processing method according to the fourth embodiment shown in FIGS. 12 and 14, later the word sequence candidate containing the forbidden words C13 and C22 will not be selected as the estimated word sequence.

The error range specified at step S404 need not necessarily be the range that can be divided into words in the estimated word sequence. Specifically, C36 shown in FIG. 17 rather than C35 shown in FIG. 17 may be specified as the error range. In this case, the forbidden word addition section 121 may store the word C13 partially containing C18 specified as the error range in the forbidden word memory part 202 as forbidden word. In the fourth embodiment, the language processing system shown in FIG. 1 further includes the mis-pronounced range instruction part 120 and the forbidden word addition section 121 by way of example. However, the language processing system shown in FIG. 7 or 10 may further include the mis-pronounced range instruction part 120 and the forbidden word addition section 121.

Likewise, as the error range specified at step S404, in the example of the Chinese text, C114 shown in FIG. 17 rather than C113 shown in FIG. 17 may be specified as the error range. In this case, the forbidden word addition section 121 may store the word C107 partially containing C115 shown in FIG. 17 specified as the error range in the forbidden word memory part 202 as forbidden word.

Fifth Embodiment

Figure 15:
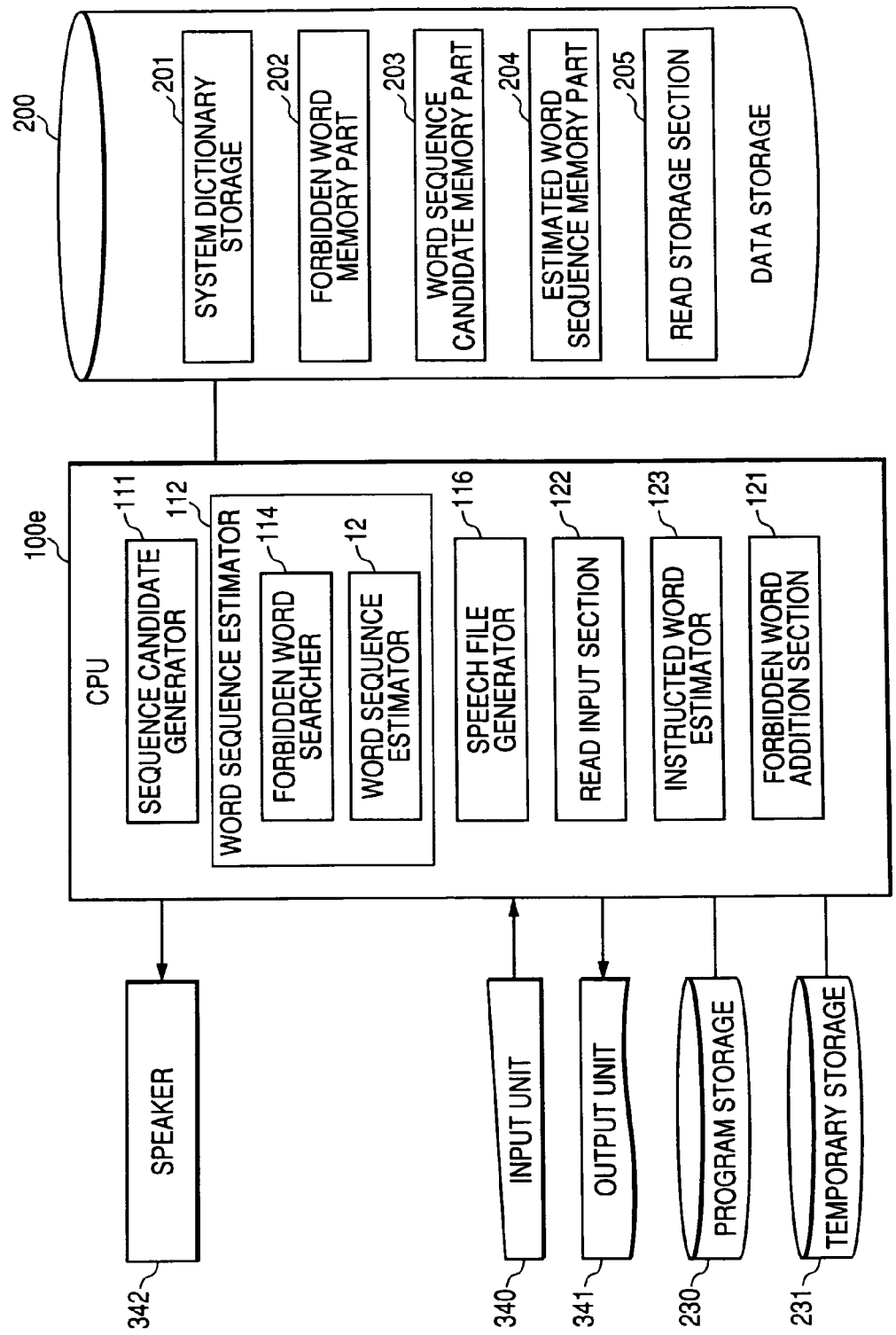
FIG. 15 is a block diagram to show a language processing system according to a fifth embodiment.

A language processing system according to a fifth embodiment differs from the language processing system shown in FIG. 1 in that a CPU 10e further includes a read input section 122, an instructed word estimator 123, and a forbidden word addition section 121 as shown in FIG. 15. Here, assume that a word sequence estimator 112 erroneously selects C31 shown in FIG. 17 as the estimated word sequence for input text C7. In this case, the read input section 122 accepts entry of "shukiokujyounokuukanga" of the correct reading of the input text C7 from the system user. The instructed word estimator 123 performs a comparison between the reading of the erroneously selected estimated word sequence and the correct reading and extracts the inconsistent range "uwanosora"] of the reading of the erroneously selected estimated word sequence different from the correct reading. The forbidden word addition section 121 stores mis-pronounced word C13 shown in FIG. 2 with reading of the inconsistent range "uwanosora" in a forbidden word memory part 202 as forbidden word. Other components of the language processing system shown in FIG. 15 are similar to those previously described with reference to FIG. 1 and therefore will not be discussed again.

Figure 29:
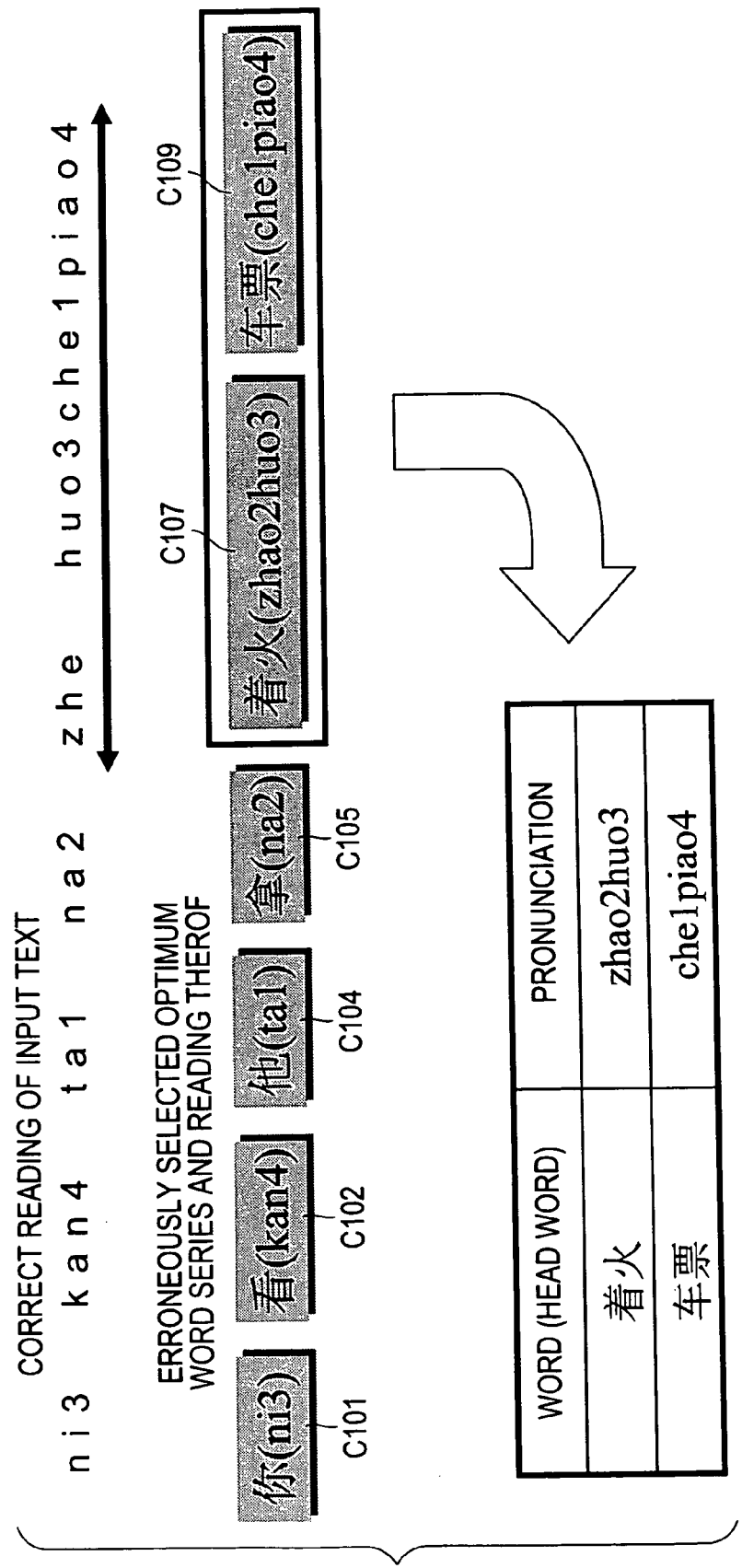
FIG. 29 is a schematic drawing for explaining an additional storing of a forbidden word for Chinese language.

Likewise, for example, as shown in FIG. 29, assume that the word sequence estimator 112 erroneously selects C101, C102, C104, C105, C107, and C109 as the estimated word sequence for Chinese input text C100. In this case, the read input section 122 accepts entry of "ni3 kan4 ta1 na2zhe huo3che1piao4" of the correct reading of the input text C100 from the system user. The instructed word estimator 123 performs a comparison between the reading of the erroneously selected estimated word sequence and the correct reading and extracts the inconsistent range "zhe huo3che1piao4" of the reading of the erroneously selected estimated word sequence different from the correct reading. The forbidden word addition section 121 stores mis-pronounced words C107 and C109 with reading of the inconsistent range "zhe huo3che1piao4" in the forbidden word memory part 202 as forbidden words.

Figure 30:
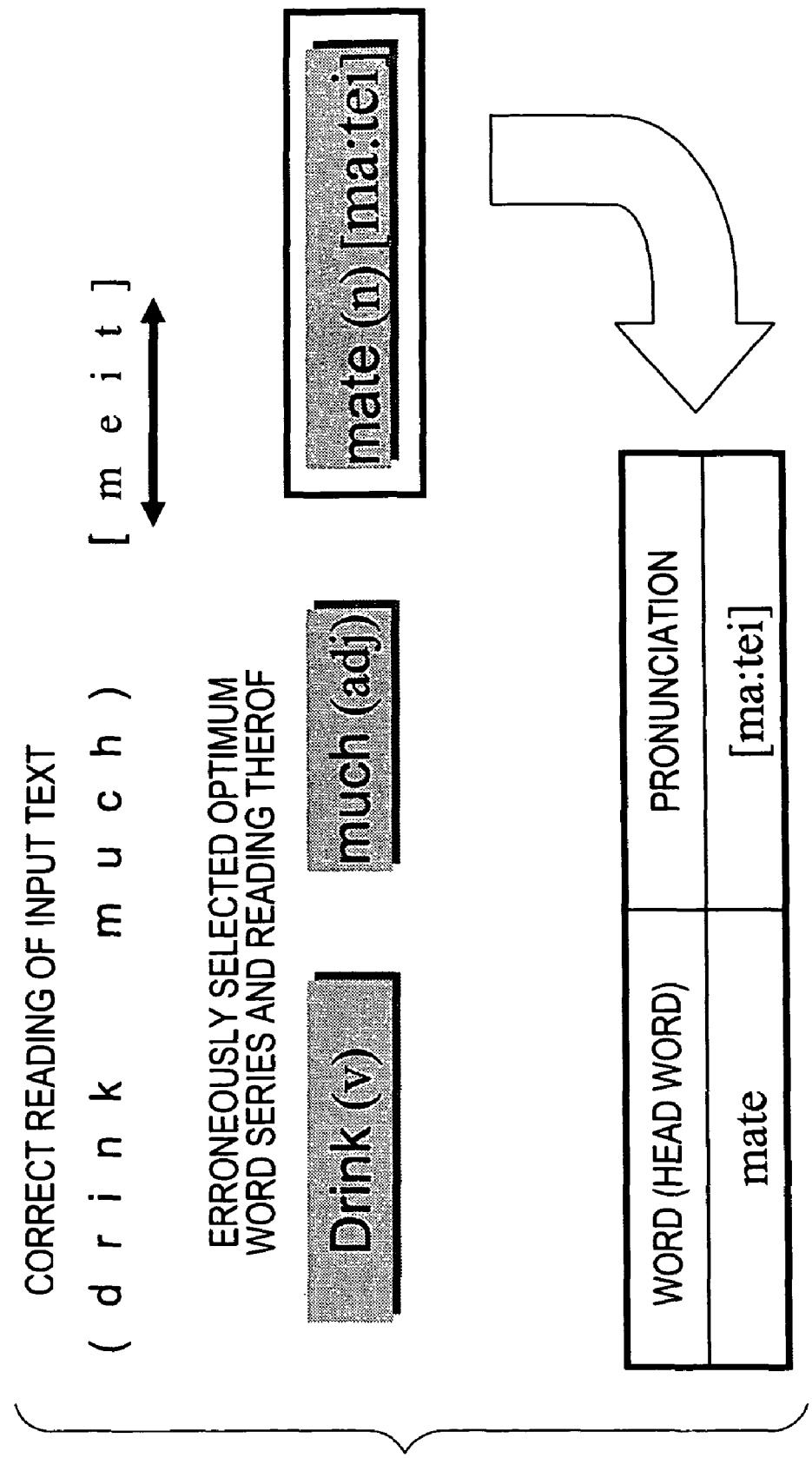
FIG. 30 is a schematic drawing for explaining an additional storing of a forbidden word for English language.

As for another example, as shown in FIG. 30, assume that the word sequence estimator 112 erroneously selects "drink (v)" "much (adv)" "mate (n) [ma:tei]" as the estimated word sequence for English input text "Drink much mate". In this case, the read input section 122 accepts entry of "drink matS meit" of the correct reading of the input text "Drink much mate" from the system user. The instructed word estimator 123 performs a comparison between the reading of the erroneously selected estimated word sequence and the correct reading and extracts the inconsistent range "meit" of the reading of the erroneously selected estimated word sequence different from the correct reading. The forbidden word addition section 121 stores mis-pronounced word "mate (n) [ma: tei]" with reading of the inconsistent range "meit" in the forbidden word memory part 202 as forbidden word.

Next, a language processing method according to the fifth embodiment will be discussed with reference to a flowchart shown in FIG. 16.

Figure 16:
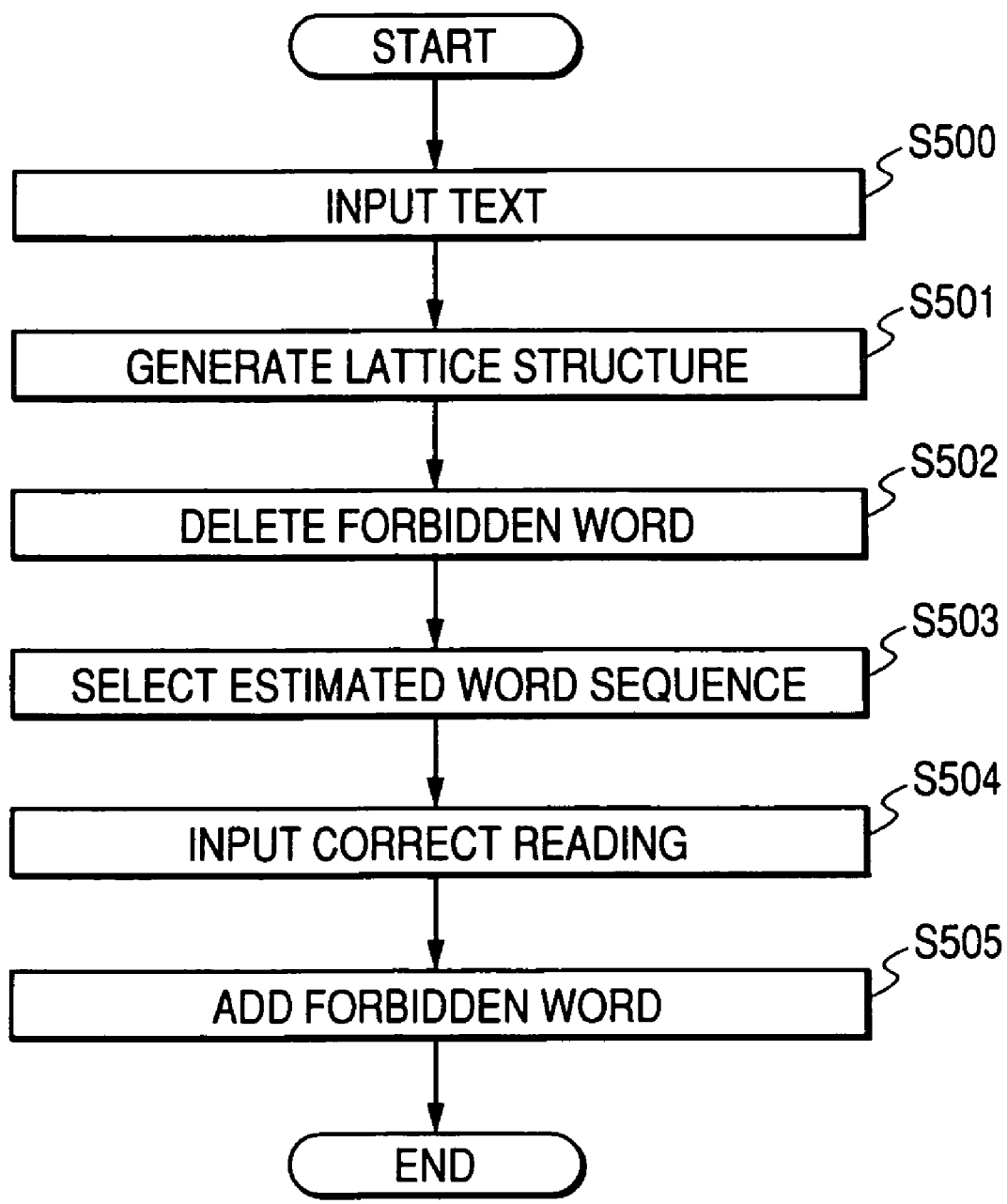
FIG. 16 is a flowchart to show a language processing system according to the fifth embodiment.

Steps S500 to S503 shown in FIG. 16 are executed like steps S400 and S403 shown in FIG. 14. Assume that the word sequence estimator 112 erroneously selects C31 shown in FIG. 17 as the estimated word sequence. Then, the word sequence estimator 112 stores the erroneously selected estimated word sequence in the estimated word sequence memory part 204, and an output unit 341 outputs the erroneously selected estimated word sequence.

At step S504, the read input section 122 accepts entry of "shukiokujyounokuukanga" of the correct reading of the input text C7 shown in FIG. 17 through an input unit 340 from the system user. The read input section 122 stores the correct reading "shukiokujyounokuukanga" in a read memory part 205. At step S405, the instructed word estimator 123 reads the erroneously selected estimated word sequence C31 from the estimated word sequence memory part 204, and reads the correct reading "shukiokujyounokuukanga" from the read memory part 205. Next, the instructed word estimator 123 performs a comparison between the reading of the erroneously selected estimated word sequence and the correct reading and extracts the inconsistent range "uwanosora" of the reading of the erroneously selected estimated word sequence different from the correct reading.

At step S505, the instructed word estimator 123 transfers the mis-pronounced word C13 shown in FIG. 2 with reading of the inconsistent range "uwanosora", contained in the erroneously selected estimated word sequence to the forbidden word addition section 121. The forbidden word addition section 121 stores the mis-pronounced word C13 in the forbidden word memory part 202 as forbidden word and terminates the language processing method according to the fifth embodiment.

As described above, according to the language processing system and the language processing method according to the fifth embodiment shown in FIGS. 15 and 16, later the word sequence candidate containing the forbidden word C13 will not be selected as the estimated word sequence. In the fifth embodiment, the language processing system shown in FIG. 1 further includes the read input section 122, the instructed word estimator 123, and the forbidden word addition section 121 by way of example. However, the language processing system shown in FIG. 7 or 10 may further include the read input section 122, the instructed word estimator 123, and the forbidden word addition section 121.

Other Embodiments

Although the invention has been described with the specific embodiments, it is to be understood that the description and the drawings forming parts of the disclosure do not limit the invention. From the disclosure, various alternative embodiments, examples, and operational arts will be apparent to those skilled in the art. For example, in the description, the read input section 122 shown in FIG. 15 accepts entry of the correct reading of the input text from the system user. In contrast, the read input section 122 may accept entry of a word with the correct reading in a part of input text from the system user. For example, if the word sequence estimator 112 erroneously selects C31 shown in FIG. 17 as the estimated word sequence, the read input section 122 may accept entry of a word C21 shown in FIG. 2 with the correct reading and the instructed word estimator 123 may extract words C13 and C22 violating the word C21.

Likewise, if the word sequence estimator 112 erroneously selects C101, C102, C104, C105, C107, and C109 as the estimated word sequence for Chinese input text C100, the read input section 122 may accept entry of word C108 shown in FIG. 22 with the correct reading and the instructed word estimator 123 may extract words C107 and C109 violating the word C108.

Likewise, if the word sequence estimator 112 erroneously selects "drink (v)" "much (adv)" "mate (n) [ma:tei]" as the estimated word sequence for English input text "Drink much mate" C200, the read input section 122 may accept entry of word "mate (n) [meit]" with the correct reading and the instructed word estimator 123 may extract word "mate (n) [ma:tei]" violating the word "mate (n) [meit]".

In the embodiments, the speech file generator 116 creates a speech file for outputting the reading of the estimated word sequence by way of example. However, the system may create a pronunciation information (phonetic symbol) file based on the estimated word sequence and further may create a speech file from the phonetic symbol file rather than creates a speech file directly from the estimated word sequence. In FIG. 1, the speaker 342 is connected to the CPU 100a by way of example. However, the speaker 342 need not necessarily be connected to the CPU 100a and the generated speech file may be used with another computer or an audio system.

The language processing method described above can be represented as a processing or operation sequence in time sequence. Therefore, for the CPU 100a shown in FIG. 1 to execute the language processing method, the language processing method shown in FIG. 5 can be realized by a computer program product for determining a plurality of functions served by a processor, etc., in the CPU 100a. The computer program product refers to a record medium, a record device, etc., for allowing data to be input/output to/from the CPU 100a. The record media contain a memory device, a magnetic disk unit, an optical disk unit, and any other device capable of recording a program. Thus, the invention contains various embodiments, etc., not described herein, of course. Therefore, the technical scope of the invention is to be determined solely by the inventive concepts which are delineated by the claims adequate from the description given above.

As described in above with reference to the embodiments, according to the invention, there is provided a language processing system of preventing generation of a word sequence containing an undesirable word for the system user.

What is claimed is:

1. A language processing system comprising:
    an input unit that receives plain text including a plurality of input characters in which no separators are included therebetween;
    a forbidden word memory part that stores a predetermined forbidden word pronunciation in association with a word having one or more characters;
    a sequence candidate generator that identifies separate words and associated pronunciations from the plurality of input characters by referring to a dictionary, generates a plurality of word sequence candidates including a plurality of the separate identified word pronunciations, and stores the plurality of word sequence candidates in a word sequence memory part, wherein each of the word sequence candidates includes all of the input characters but has a different identified word pronunciation than the other word sequence candidates; and
    a word sequence estimator that reads the predetermined forbidden word pronunciation from the forbidden word memory part and the plurality of word sequence candidates from the word sequence memory part, determines whether each of the plurality of word sequence candidates contains the predetermined forbidden word pronunciation, eliminates each of the plurality of word sequence candidates containing the predetermined forbidden word pronunciation, and selects an estimated word sequence with the highest concatenation possibility of the words from among the plurality of remaining word sequence candidates.

2. The language processing system according to claim 1, further comprising:
    a mis-pronounced range instruction part that accepts instruction of a mis-pronounced word with different reading from a correct reading of text in the estimated word sequence.

3. The language processing system according to claim 2, further comprising:
    a forbidden word addition section that additionally stores the mis-pronounced word in the forbidden word memory part as the forbidden word pronunciation.

4. The language processing system according to claim 1, further comprising:
    an instructed word estimator that performs a comparison between a reading of the estimated word sequence and a correct reading of text in the estimated word sequence, and extracts a mis-pronounced word with different reading from the correct reading from the estimated word sequence.

5. The language processing system according to claim 4, further comprising:
    a forbidden word addition section that additionally stores the mis-pronounced word in the forbidden word memory part as the forbidden word pronunciation.

6. A language processing system comprising:
    an input unit that receives plain text including a plurality of input characters in which no separators are included therebetween;
    a forbidden word memory part that stores a predetermined forbidden word pronunciation in association with a word having one or more characters;
    a sequence candidate generator that reads the predetermined forbidden word pronunciation stored in the forbidden word memory part, identifies separate words and associated pronunciations from the plurality of input characters by referring to a dictionary, determines whether each of the plurality of identified word pronunciations match the predetermined forbidden word pronunciation, excludes each of the plurality of word pronunciations matching the predetermined forbidden word pronunciation, generates a plurality of word sequence candidates including a plurality of the separate identified word pronunciations, and stores the plurality of word sequence candidates in a word sequence memory part, wherein each of the word sequence candidates includes all of the input characters but has a different identified word pronunciation than the other word sequence candidates; and
    a word sequence estimator that selects an estimated word sequence with the highest concatenation possibility of the words from among the plurality of word sequence candidates.

7. The language processing system according to claim 6, further comprising:
    a mis-pronounced range instruction part that accepts instruction of a mis-pronounced word with different reading from a correct reading of text in the estimated word sequence.

8. The language processing system according to claim 7, further comprising:
    a forbidden word addition section that additionally stores the mis-pronounced word in the forbidden word memory part as the forbidden word pronunciation.

9. The language processing system according to claim 6, further comprising:
    an instructed word estimator that performs a comparison between a reading of the estimated word sequence and a correct reading of text in the estimated word sequence, and extracts a mis-pronounced word with different reading from the correct reading from the estimated word sequence.

10. The language processing system according to claim 9, further comprising:
    a forbidden word addition section that additionally stores the mis-pronounced word in the forbidden word memory part as the forbidden word pronunciation.

* * * * *